(12) United States Patent
Onnerud et al.

(10) Patent No.: US 7,381,496 B2
(45) Date of Patent: Jun. 3, 2008

(54) LITHIUM METAL OXIDE MATERIALS AND METHODS OF SYNTHESIS AND USE

(75) Inventors: Per T. Onnerud, Framingham, MA (US); Jay Jie Shi, Acton, MA (US); Sharon L. Dalton, Stoneham, MA (US); Christina Lampe-Onnerud, Framingham, MA (US)

(73) Assignee: Tiax LLC, Cambridge, MA (US)

( * ) Notice: Subject to any disclaimer, the term of this patent is extended or adjusted under 35 U.S.C. 154(b) by 805 days.

(21) Appl. No.: 10/850,877

(22) Filed: May 21, 2004

(65) Prior Publication Data

US 2005/0260495 A1  Nov. 24, 2005

(51) Int. Cl.
*H01M 4/58* (2006.01)
(52) U.S. Cl. .............................. 429/231.1; 429/231.3; 429/223; 429/231.6; 252/182.1; 423/592.1; 423/593.1; 423/594.4; 423/594.6; 427/58; 427/123
(58) Field of Classification Search ............. 429/231.1, 429/231.3, 223, 231.6; 252/182.1; 423/592.1, 423/593.1, 594.4, 594.6; 427/58, 123
See application file for complete search history.

(56) References Cited

U.S. PATENT DOCUMENTS

| | | | |
|---|---|---|---|
| 4,520,084 A | 5/1985 | Tinker et al. |
| 4,526,881 A | 7/1985 | Binder et al. |
| 4,980,080 A | 12/1990 | Lecerf et al. |
| 5,264,201 A | 11/1993 | Dahn et al. |
| 5,286,582 A | 2/1994 | Tahara et al. |
| 5,518,842 A | 5/1996 | Fey et al. |
| 5,531,920 A | 7/1996 | Mao et al. |
| 5,591,543 A | 1/1997 | Peled et al. |
| 5,629,110 A | 5/1997 | Kobayashi et al. |
| 5,631,105 A | 5/1997 | Hasegawa et al. |
| 5,648,057 A | 7/1997 | Ueda et al. |
| 5,672,447 A | 9/1997 | Yamawaki et al. |
| 5,679,481 A | 10/1997 | Takanishi et al. |
| 5,693,435 A | 12/1997 | Amatucci et al. |
| 5,728,367 A | 3/1998 | Mao |
| 5,750,288 A | 5/1998 | Xie et al. |
| 5,783,333 A | 7/1998 | Mayer |

(Continued)

FOREIGN PATENT DOCUMENTS

EP  0 468 942 A2  1/1992

(Continued)

OTHER PUBLICATIONS

Jim, Y., et. al., "Electrochemical Characterizations of Commercial LiCoO2 Powders with Surface Modified by Li3 PO4 Nanoparticles," Electrochemical and Solid-State Letters, 9 (6) A273-A276 (2006).

(Continued)

*Primary Examiner*—Laura S Weiner
(74) *Attorney, Agent, or Firm*—Lowrie, Lando & Anastasi, LLP

(57) ABSTRACT

A composition having a formula $Li_xMg_yNiO_2$ wherein $0.9<x<1.3$, $0.01<y<0.1$, and $0.91<x+y<1.3$ can be utilized as cathode materials in electrochemical cells. A composition having a core, having a formula $Li_xMg_yNiO_2$ wherein $0.9<x<1.3$, $0.01<y<0.1$, and $0.9<x+y<1.3$, and a coating on the core, having a formula $Li_aCo_bO_2$ wherein $0.7<a<1.3$, and $0.9<b<1.2$, can also be utilized as cathode materials in electrochemical cells.

15 Claims, 12 Drawing Sheets

U.S. PATENT DOCUMENTS

| | | | |
|---|---|---|---|
| 5,879,654 A | 3/1999 | Van Ghemen et al. |
| 5,885,544 A | 3/1999 | Yamazaki et al. |
| 5,914,094 A | 6/1999 | Sun et al. |
| 5,932,632 A | 8/1999 | Biensan et al. |
| 5,985,488 A | 11/1999 | Mitate et al. |
| 5,993,998 A | 11/1999 | Yasuda |
| 6,007,947 A | 12/1999 | Mayer |
| 6,017,654 A | 1/2000 | Kumta et al. |
| 6,033,807 A | 3/2000 | Yasuda |
| 6,040,090 A | 3/2000 | Sunagawa et al. |
| 6,045,771 A | 4/2000 | Matsubara et al. |
| 6,048,643 A | 4/2000 | Van Ghemen et al. |
| 6,071,645 A | 6/2000 | Biensan et al. |
| 6,071,649 A | 6/2000 | Mao et al. |
| 6,242,134 B1 | 6/2001 | Fujiwara et al. |
| 6,274,272 B1 | 8/2001 | Peres et al. |
| 6,277,521 B1 | 8/2001 | Gao et al. |
| 6,296,972 B1 | 10/2001 | Hong et al. |
| 6,361,822 B1 | 3/2002 | Kurose et al. |
| 6,372,385 B1 | 4/2002 | Kweon et al. |
| 6,379,842 B1 | 4/2002 | Mayer |
| 6,383,235 B1 | 5/2002 | Maegawa et al. |
| 6,436,577 B1 | 8/2002 | Kida et al. |
| 6,447,739 B1 | 9/2002 | Krynitz et al. |
| 6,482,550 B1 | 11/2002 | Imachi et al. |
| 6,582,854 B1 | 6/2003 | Qi et al. |
| 6,713,037 B2 | 3/2004 | Van Neste |
| 6,737,037 B2 | 5/2004 | Ramasamy et al. |
| 6,756,155 B1 | 6/2004 | Kweon et al. |
| 6,773,852 B2 | 8/2004 | Cho et al. |
| 6,794,085 B2 | 9/2004 | Gao et al. |
| 6,855,461 B2 | 2/2005 | Lampe-Onnerud et al. |
| 6,875,416 B1 | 4/2005 | Benz et al. |
| 6,881,520 B1 | 4/2005 | Li |
| 6,902,745 B2 | 6/2005 | Lee et al. |
| 6,916,579 B2 | 7/2005 | Gorchkov et al. |
| 6,916,580 B2 | 7/2005 | Cho et al. |
| 6,921,609 B2 | 7/2005 | Lampe-Onnerud et al. |
| 6,949,233 B2 | 9/2005 | Kweon et al. |
| 2001/0031311 A1 | 10/2001 | Lee et al. |
| 2002/0071991 A1 | 6/2002 | Kweon et al. |
| 2002/0119374 A1 | 8/2002 | Yang et al. |
| 2002/0142225 A1 | 10/2002 | Kweon et al. |
| 2002/0192148 A1 | 12/2002 | Kweon et al. |
| 2002/0192552 A1 | 12/2002 | Lampe-Onnerud et al. |
| 2002/0192556 A1 | 12/2002 | Lampe-Onnerud et al. |
| 2003/0013017 A1 | 1/2003 | Nagayama et al. |
| 2003/0124424 A1 | 7/2003 | Takahashi et al. |
| 2003/0180616 A1 | 9/2003 | Johnson et al. |
| 2004/0053133 A1 | 3/2004 | Li |
| 2004/0062993 A1 | 4/2004 | Yanagida et al. |
| 2004/0062995 A1 | 4/2004 | Yanagida et al. |
| 2004/0081889 A1 | 4/2004 | Lee et al. |
| 2004/0096742 A1 | 5/2004 | Akashi et al. |
| 2004/0110064 A1 | 6/2004 | Kitao et al. |
| 2004/0110065 A1 | 6/2004 | Hamano et al. |
| 2004/0142241 A1 | 7/2004 | Nagayama et al. |
| 2004/0142247 A1 | 7/2004 | Yoshimura et al. |
| 2004/0157124 A1 | 8/2004 | Goh et al. |
| 2004/0161668 A1 | 8/2004 | Maeda et al. |
| 2004/0180263 A1 | 9/2004 | Kase et al. |
| 2004/0191628 A1* | 9/2004 | Inoue et al. ............. 429/231.1 |
| 2004/0197659 A1 | 10/2004 | Kumar et al. |
| 2004/0265216 A1 | 12/2004 | Nazri et al. |
| 2005/0037263 A1 | 2/2005 | Wang et al. |
| 2005/0069774 A1 | 3/2005 | Miyazaki et al. |
| 2005/0069775 A1 | 3/2005 | Hwang et al. |
| 2005/0175897 A1 | 8/2005 | Jung et al. |
| 2005/0238956 A1 | 10/2005 | Lee |
| 2005/0266316 A1 | 12/2005 | Kitao et al. |
| 2005/0271945 A1 | 12/2005 | Takahashi et al. |

FOREIGN PATENT DOCUMENTS

| | | |
|---|---|---|
| EP | 0 587 973 A1 | 3/1994 |
| EP | 0 744 780 A1 | 11/1996 |
| EP | 0 702 421 B1 | 12/1998 |
| EP | 0 468 942 B2 | 12/1999 |
| EP | 0 986 116 A1 | 3/2000 |
| EP | 1 111 701 A1 | 6/2001 |
| JP | 08-064209 | 3/1996 |
| JP | 08-064244 | 3/1996 |
| JP | 08-096794 | 4/1996 |
| JP | 08-138726 | 5/1996 |
| JP | 08-138734 | 5/1996 |
| JP | 08-148141 | 6/1996 |
| JP | 08-148147 | 6/1996 |
| JP | 08-162112 | 6/1996 |
| JP | 08-203561 | 8/1996 |
| JP | 08-213050 | 8/1996 |
| JP | 08-306358 | 11/1996 |
| JP | 09-050810 | 2/1997 |
| JP | 09-180720 | 7/1997 |
| JP | 09-245789 | 9/1997 |
| JP | 09-245835 | 9/1997 |
| JP | 09-259881 | 10/1997 |
| JP | 10-074516 | 3/1998 |
| JP | 10-074517 | 3/1998 |
| JP | 10-083816 | 3/1998 |
| JP | 10-114527 | 5/1998 |
| JP | 10-114528 | 5/1998 |
| JP | 10-139429 | 5/1998 |
| JP | 10-139430 | 5/1998 |
| JP | 10-172613 | 6/1998 |
| JP | 10-182157 | 7/1998 |
| JP | 10-182160 | 7/1998 |
| JP | 10-182161 | 7/1998 |
| JP | 10-188954 | 7/1998 |
| JP | 10-236826 | 9/1998 |
| JP | 10-255804 | 9/1998 |
| JP | 10-283839 | 10/1998 |
| JP | 10-308216 | 11/1998 |
| JP | 10-308219 | 11/1998 |
| JP | 11-067209 | 3/1999 |
| JP | 11-111338 | 4/1999 |
| JP | 11-149926 | 6/1999 |
| JP | 11-162454 | 6/1999 |
| JP | 11-176439 | 7/1999 |
| JP | 11-191408 | 7/1999 |
| JP | 11-214012 | 8/1999 |
| JP | 11-246225 | 9/1999 |
| JP | 11-278848 | 10/1999 |
| JP | 11-310416 | 11/1999 |
| JP | 2000-156230 | 6/2000 |
| JP | 2000-169150 | 6/2000 |
| JP | 2000-200604 | 7/2000 |
| JP | 2000-231933 | 8/2000 |
| JP | 2000-299133 | 10/2000 |
| JP | 2000-311718 | 11/2000 |
| JP | 2000-315524 | 11/2000 |
| JP | 2000-331711 | 11/2000 |
| JP | 2000-348729 | 12/2000 |
| JP | 2001-068152 | 3/2001 |
| JP | 2001-210316 | 8/2001 |
| JP | 2001-357891 | 12/2001 |
| JP | 2002-025556 | 1/2002 |
| JP | 2002-141069 | 5/2002 |
| JP | 2002-313422 | 10/2002 |
| JP | 2002-313423 | 10/2002 |
| JP | 2003-151626 | 5/2003 |
| JP | 2003-346797 | 12/2003 |
| JP | 2004-288579 | 10/2004 |

| | | |
|---|---|---|
| JP | 2005-190996 | 7/2005 |
| WO | WO 96/41385 | 12/1996 |
| WO | WO 98/16960 | 4/1998 |
| WO | WO 98/20571 | 5/1998 |
| WO | WO 98/24131 A1 | 6/1998 |
| WO | WO 98/54769 | 12/1998 |
| WO | WO 98/54772 | 12/1998 |
| WO | WO 98/54773 | 12/1998 |
| WO | WO 00/11738 A1 | 3/2000 |
| WO | WO 02/103823 A2 | 12/2002 |
| WO | WO 02/103824 A2 | 12/2002 |
| WO | WO 03/041193 | 5/2003 |
| WO | WO 2005/055344 A2 | 6/2005 |
| WO | WO 2005/113849 | 12/2005 |

OTHER PUBLICATIONS

Cho et al., "Annealing-Temperature Effect on Various Cutoff-Voltage Electrochemical Performances in AlPO$_4$-Nanoparticle-Coated LiCoO$_2$," *Journal of The Electrochemical Society*, 152(1), 2005, pp. A32-A36.

Chung et al., "In Situ XRD Studies of the Structural Changes of ZrO$_2$ Coated LiCoO$_2$ During Cycling and Their Effects on Capacity Retention in Lithium Batteries," publication date unknown, 1 page.

Eftekhari, "Mixed-Metals Codeposition as a Novel Method for the Preparation of LiMn$_2$O$_4$ Electrodes with Reduced Capacity Fades," *Journal of The Electrochemical Society*, 150(7), 2003, pp. A966-A969.

Eftekhari, "LiMn$_2$O$_4$ electrode prepared by gold-titanium codeposition with improved cyclability," *Journal of Power Sources*, 130, 2004, pp. 260-265.

Eriksson, "LiMn$_2$O$_4$ as a Li-Ion Battery Cathode," Comprehensive Summaries of Uppsala Dissertations from the Faculty of Science and Technology 651, 2001, pp. 1-53.

Fey et al., "Electrochemical studies on LiCoO$_2$ coated with Al$_2$O$_3$ derived from carboxylate-alumoxane," Department of Chemical and Materials Engineering, Department of Chemistry, National Central University, Chung-Li, Taiwan, R.O.C., publication date unknown, 1 page.

Gnanaraj et al., "Improving the high-temperature performance of LiMn$_2$O$_4$ spinel electrodes by coating the active mass with MgO via a sonochemical method," *Electrochemistry Communications* 5, 2003, pp. 940-945.

Kim et al., "Washing Effect of LiNi$_{0.83}$Co$_{0.15}$O$_2$ Cathode in Water," Abstract from *Electrochemical Solid-State Letters*, vol. 1, Issue 1, 2006, pp. A19-A23, http://www.ecsdl.org, printed Mar. 23, 2006.

Kim et al., "Electrochemical Properties of Li(Ni$_{1/3}$Co$_{1/3}$Mn$_{1/3}$)O$_2$ Synthesized by Hydrothermal Process," Department of Materials and Science Engineering, Korea, publication date unknown, 1 page.

Lee et al., "Effect of AlPO$_4$-Nanoparticle Coating Concentration on High-Cutoff-Voltage Electrochemical Performances in LiCoO$_2$," *Journal of The Electrochemical Society*, 151(6), 2004, pp. A801-A805.

Lee et al., "A Study of Electrochemical Kinetics of Lithium Ion in Organic Electrolytes," *Korean J. Chem. Eng.*, 19(4), 2002, pp. 638-644.

Nordlinder, "Nanotubes for Battery Applications," Digital Comprehensive Summaries of Uppsala Dissertations from the Faculty of Science and Technology 72, 2005, pp. 9-60.

Stroeve et al., "Improvement of Thermal Stability of LI-ION Batteries by Ploymer Coating of LiMn$_2$O$_4$," Institute of Transportation Studies, University of California, Davis, May 2004, pp. 2-34, UCD-ITS-RR-04-11.

Xie et al., "Electrochemical Performances of Nanosized Intermetallic Compound CoSb$_2$ Prepared by the Solvothermal Route," *Journal of The Electrochemical Society*, 151 (11), 2004, pp. A1905-A1910.

Search Report (miscellaneous) publication date unknown.

\* cited by examiner

500X

500X

LITHIUM METAL OXIDE MATERIALS AND METHODS OF SYNTHESIS AND USE

BACKGROUND OF THE INVENTION

1. Field of the Invention

The present invention relates to lithium metal oxide compositions as well as electrochemical devices utilizing such compositions and, in particular, to lithium-magnesium nickel oxide compositions suitable as components of lithium-ion electrochemical devices.

2. Description of Related Art

Rechargeable lithium and lithium-ion batteries can be used in a variety of applications, such as cellular phones, laptop computers, digital cameras and video cameras, and hybrid electric vehicles etc., due to their high energy density.

Commercially available lithium-ion batteries typically consist of graphite-based anode and $LiCoO_2$-based cathode materials. However, $LiCoO_2$-based cathode materials can be expensive and typically have relatively low capacity, approximately 150 mAh/g.

Alternatives to $LiCoO_2$-based cathode materials include $LiNiO_2$-based cathode materials, which can be less expensive. Typical $LiNiO_2$-based cathode materials can include compositions having a formula $LiNi_{0.8}Co_{0.2}O_2$ or $LiNi_{0.8}Co_{0.15}Al_{0.05}O_2$. These materials are relatively more expensive than cobalt-free $LiNiO_2$-based cathode material because of the relatively higher cost of cobalt relative to nickel. Furthermore, $LiNiCoO_2$-based cathode materials usually have lower safety, cyclability, and first cycle efficiency over $LiCoO_2$-based cathode materials because of the lower structural stability and higher surface reactivity of $LiNiO_2$ type cathodes.

Li(Ni, Co)$O_2$-based cathode materials have also been disclosed. For example, Lecerf et al., in U.S. Pat. No. 4,980,080, disclosed a process of making a cathode material for a secondary battery having a formula $Li_yNi_{2-y}O_2$ or $Li_{1-x}Co_xO_2$. Xie et al., in U.S. Pat. No. 5,750,288, disclosed modified lithium nickel oxide compounds for electrochemical cathodes and cells based on $Li_xM_yO_z$ materials, where M is a non-transition metal selected from the group consisting of aluminum, gallium, tin and zinc. Mayer, in U.S. Pat. No. 5,783,333, disclosed a $Li_xNi_yCO_zM_nO_2$ material. Mayer also disclosed, in U.S. Pat. Nos. 6,007,947 and 6,379,842, cathode materials having a formula $Li_xNi_yCO_zM_nO_2$ or $Li_xMn_{2-r}M1_rO_4$ where M is a metal selected from the group consisting of aluminum, titanium, tungsten, chromium, molybdenum, magnesium, tantalum, silicon, and combinations thereof and M1 is one of chromium, titanium, tungsten, nickel, cobalt, iron, tin, zinc, zirconium, silicon, or a combination thereof. Kumta et al., in U.S. Pat. No. 6,017,654, disclosed cathode materials having a formula $Li_{1+x}Ni_{1-y}M_yN_xO_{2(1+x)}$ and $LiN_{1-y}M_yN_xO_p$ where M is a transition metal selected from the group consisting of titanium, vanadium, chromium, manganese, iron, cobalt, and aluminum and N is a Group II element selected from the group consisting of magnesium, calcium, strontium, barium, and zinc. Sunagawa et al., in U.S. Pat. No. 6,040,090, disclosed a positive electrode material based on Li—Ni—Co—Mn—$O_2$. Peres et al., in U.S. Pat. No. 6,274,272, disclosed an active cathode material having a formula $Li_LNi_{(I-C-A-M)}Co_CAl_AMg_MO_2$. Gao et al., in U.S. Pat. No. 6,277,521, disclosed a lithium metal oxide material containing multiple dopants with a formula $LiN_{1-x}CO_yM_aM'_bO_2$ where M is a metal selected from the group consisting of titanium, zirconium, and combinations thereof and M' is a metal selected from the group consisting of magnesium, calcium, strontium, barium, and combinations thereof. Mao et al., in U.S. Pat. No. 6,071,649, disclosed $LiCoO_2$-coated $LiNiO_2$ or Li(Ni,Co)$O_2$ materials. None of these disclosed Li—Mg—Ni—$O_2$-based cathode materials.

Matsubara et al, in U.S. Pat. No. 6,045,771, disclosed a cathode material having a formula $Li_{y-x1}Ni_{1-x2}M_xO_2$ where M is a metal selected from the group consisting of aluminum, iron, cobalt, manganese, and magnesium, $x=x1+x2$, $0<x1\leq0.2$, $0<x2\leq0.5$, $0<x\leq0.5$, and $0.9\leq y\leq1.3$.

Multiple companies are also commercially fabricating cathodes utilizing materials with a general formula $LiNiCoMO_2$. TODA (earlier Fuji Chemical) manufactures products CA5, CA1505N, and NCA. Honjo-FMC and Nichia (both of Japan) also provide nickel-cobalt-based cathodes. These products typically suffer from low safety properties, and relatively low rate capability.

BRIEF SUMMARY OF THE INVENTION

In accordance with one or more embodiments, the t present invention relates to $Li_xMg_yNiO_2$ materials, which, when utilized in electrochemical applications or systems, can be characterized as being or providing systems that utilize safer, low-cost cathode materials with high capacity, long cycle life, high rate, especially high powerability, as well as high voltage. In some embodiments, the cathode materials of the present invention can be characterized as being lower cost, having improved chemically stability, and higher operating voltage while providing greater capacity especially, for example, relative to $LiCoO_2$- and/or $LiNiO_2$-based cathode materials.

In accordance with one or more embodiments, the present invention provides a composition having a formula $Li_xMg_yNiO_2$ wherein $0.9<x<1.3$, $0.01<y<0.1$, and $0.91<x+y<1.3$.

In accordance with further embodiments, the present invention provides a composition comprising a core having a formula $Li_xMg_yNiO_2$, wherein $0.9<x<1.3$, $0.01<y<0.1$, and $0.91<x+y<1.3$, and a coating on the core having a formula $Li_aCo_bO_2$, wherein $0.7<a<1.3$, and $0.9<b<1.2$.

In accordance with one or more embodiments, the present invention provides an electrochemical cell comprising a cathode comprising a composition having a formula $Li_xMg_yNiO_2$, wherein $0.9<x<1.3$, $0.01<y<0.1$, and $0.91<x+y<1.3$.

In accordance with one or more embodiments, the present invention provides an electrochemical cell comprising a cathode comprising particles consisting of a core having a formula $Li_xMg_yNiO_2$, wherein $0.9<x<1.3$, $0.01<y<0.1$, and $0.91<x+y<1.3$, and a coating on the core. The coating can have a formula $Li_aCo_bO_2$, wherein $0.7<a<1.3$, and $0.9<b<1.2$.

A method of preparing a composition comprising providing a mixture of compounds comprising a lithium source, a magnesium source, and a nickel source and reacting the mixture in an oxidizing atmosphere at a temperature and for a period sufficient to crystallize the mixture into a $Li_xMg_yNiO_2$ composition wherein $0.9<x<1.3$, $0.01<y<0.1$, and $0.91<x+y<1.3$.

In accordance with one or more embodiments, the present invention provides a method of preparing coated particles. The method can comprise steps of providing a first mixture of compounds comprising lithium, magnesium, and nickel and sintering the first mixture in an oxidizing atmosphere at a first temperature and for a first period sufficient to crystallize the first mixture into core particles having a formula $Li_xMg_yNiO_2$, wherein $0.9<x<1.3$, $0.01<y<0.1$, and $0.91<x+y<1.3$; and coating the core particles with a second mixture comprising compounds comprising lithium and cobalt and sintering the coated core particles at a second temperature and for a second period sufficient to crystallize the coating having a formula $Li_aCo_bO_2$ wherein $0.7<a<1.3$, and $0.9<b<1.2$.

In accordance with one or more embodiments, the present invention provides a particle comprising a core material having a composition of a formula $Li_{1-y}Mg_yNiO_2$ where Mg and Li are predominantly in a crystallographic 3a site and Ni is predominantly in a crystallographic 3b site and $0.01<y<0.1$.

Other advantages, novel features, and objects of the invention should become apparent from the following detailed description of the invention when considered in conjunction with the accompanying drawings, which are schematic and not intended to be drawn to scale.

BRIEF DESCRIPTION OF THE DRAWINGS

Preferred, non-limiting embodiments of the present invention will be described by way of example with reference to the following, accompanying drawings. In the drawings, each identical or nearly identical component that is illustrated in various figures is typically represented by a like numeral. For clarity, not every component may be labeled in every drawing nor is every component shown where illustration is not necessary to allow those of ordinary skill in the art to understand the invention. In the drawings.

DETAILED DESCRIPTION OF THE INVENTION

Figure 1:
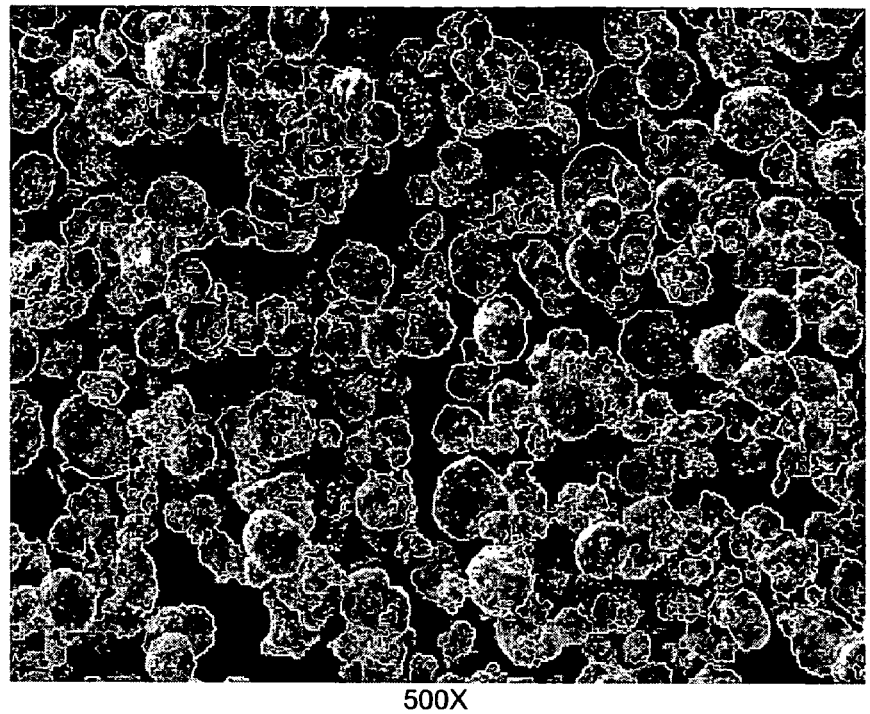
FIG. 1 is a copy of photomicrograph, representing a typical lithium-magnesium-nickel oxide composition in accordance with one or more embodiments of the present invention; here represented by spherical $LiMg_{0.025}NiO_2$.

This invention is not limited in its application to the details of construction and the arrangement of components or compounds set forth in the following description, including the various examples, or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In accordance with one or more embodiments, the present invention provides one or more compositions and one or more methods for forming the various compositions. The compositions can be used as a cathode active material in, for example, rechargeable lithium and lithium-ion electrochemical devices, such as but not limited to, batteries. In accordance with one or more embodiments, the present invention can also provide rechargeable lithium batteries or lithium-ion batteries, as well as methods of preparation and use, utilizing, for example, the compositions of the invention. The electrochemical cells utilizing the compositions of the present invention can be characterized as, inter alia, being low cost and chemically stable while providing high capacity during a long operating life.

In accordance with some embodiments, the composition of the present invention typically exhibits improved capacity, cyclability, and safety over $LiCoO_2$ and $LiNiO_2$ materials when such materials are utilized in electrochemical devices, including, but not limited to primary and secondary batteries. The materials of the present invention can provide economic advantages because they are typically less expensive to produce and/or utilize compared to $LiCoO_2$, $LiNiO_2$ or $LiNi_{0.8}Co_{0.2}O_2$-based materials.

In accordance with one or more embodiments, the present invention provides a lithium metal oxide composition having a first metal substantially associated with an a-site and a second metal substantially associated with a b-site in a crystalline lattice. The a-site can be crystallographically referred to as the 3a site and the b-site can be referred to as the 3b site in a Rm crystal lattice. In accordance with some embodiments of the invention, the first metal can be associated at the 3a site along with, for example, lithium, and the second metal can be associated at the 3b site. Preferably, the first metal or, in some cases the second metal, can provide crystalline stability during lithium intercalation and de-intercalation processes when, for example, the materials or compositions of the present invention are utilized as components of electrochemical devices. By providing such a structure, the composition of the present invention can be advantageously utilized as a cathode in electrochemical devices because, it is believed, the first metal can stabilize, at least partially, the crystal lattice during lithium intercalation and de-intercalation processes.

In accordance with one or more preferred embodiments of the invention, the composition can comprise a lithium-magnesium-nickel oxide wherein lithium and magnesium are crystallographically associated with the 3a site and nickel is crystallographically associated with the 3b site.

In accordance with one or more embodiments, the present invention provides a composition having a general formula $Li_xMg_yNiO_2$, where $0.9<x<1.3$, and $0.01<y<0.1$, $0.91<x+y<1.3$, preferably, $0.9<x<1.1$ and $0.02<y<0.05$. The crystalline characteristics of the composition can be characterized as having lithium and magnesium associated with the 3a site and the nickel as being associated with the 3b site.

In accordance with further embodiments, the present invention provides a particle comprising a core or interior layer having one or more layers of a metal oxide coating applied thereon. The coating layer can comprise a second lithium intercalating material including, for example, a compound having a formula $Li_aCo_bO_2$, where $0.7<a<1.3$, and $0.9<b<1.2$. In some cases, the coating layer can be characterized as having a Co/Ni molar ratio that ranges from about 0.01 to about 1.4, relative to the amount of nickel in the core layer. In still further embodiments of the invention, $0.9<a<1.3$, $1.8<b<2.2$ and the Co/Ni molar ratio can range from about 0.02 to about 0.8. The one or more layers can be characterized as having a concentration gradient with respect to the amount of cobalt relative to distance, e.g. radial distance, from the surface of the particle. The nature of the concentration gradient of the amount cobalt, relative to distance from the surface, can range from about 100%, substantially all cobalt and none or only negligible trace amounts of nickel, at the outer surface of the particle to about 0%, substantially none or only negligible trace amounts of cobalt at the coating/core interface. The nature or shape of the gradient profile can vary. For example, the gradient profile can linearly decrease relative to radial distance from the surface.

In accordance with still further embodiments, the invention can be characterized as providing a particle comprising a lithium magnesium nickel oxide core having a lithium cobalt oxide coating layer. The amount of the coating layer can range from about 0.01 wt % to about 30 wt % of the particle.

The present invention further provides one or more synthesis techniques that provides a first metal having a preferential association with the 3a site and, in some cases, provides a second metal having a preferential association with the 3b site. In accordance with still other embodiments, the present invention provides synthesis techniques that can decrease any tendency by the second metal to associate with the 3a site.

The first metal can provide crystalline stability to the lithium mixed metal oxide material during lithium intercalation/de-intercalation cycling processes. Thus, the techniques of the present invention can provide a chemically stable material that may be suitable as components, e.g. cathodes, in electrochemical devices and be characterized as having high capacity, low cost as well as high voltage and high rate with improved cycle life.

In accordance with one or more embodiments, the techniques of the present invention can utilize precursor compounds that can form a lithium metal oxide, preferably a lithium metal oxide doped with a crystal lattice stabilizing metal. In accordance with other embodiments, the techniques of the present invention can provide or promote processing conditions that favor the formation of ionic species from precursor compounds that can preferentially become associated with specific crystallographic sites. The processing conditions of the present invention can promote formation of metal oxide species as well as association of such species with a particular, predetermined crystallographic site. For example, the techniques of the present invention can utilize one or more lithium donor compounds, one or more metal donor compounds that preferentially can become associated with a 3a crystallographic site, and in some cases, one or more metal donor compounds that preferentially become associated with a 3b crystallographic site. Thus, in accordance with one or more embodiments, the present invention can utilize a lithium donor compound, a magnesium metal donor compound, and a nickel metal donor compound; the processing conditions can promote ionic species formation, intermingling, and crystallization to form a lithium mixed metal oxide wherein a first metal can be preferentially associated with a 3a crystallographic site and a second metal can be preferentially associated with a 3b site.

In accordance with further embodiments, the techniques of the present invention can provide a lithium magnesium nickel oxide composition. For example, one or more techniques can utilize precursor compounds including, for example, those selected from the group consisting of a lithium donor, a magnesium donor, and a nickel donor. In some cases, one or more oxidizing agents or compounds can also be utilized. Thus, the precursor compound mixture can comprise, for example, a lithium source, an oxidizing agent, a first metal donor, and a second metal donor. The lithium source, the oxidizing agent, the first metal donor, and the second metal donor, preferably, can undertake one or more phase changes or phase transitions at about the same processing conditions, e.g., at about the same processing temperature range. Preferably, the elements of the selected precursor compounds can maintain their respective predetermined valences until, or in some cases through, the phase change. Likewise, the processing conditions utilized inhibit or at least do not promote any valence changes. Thus, in accordance with one or more preferred embodiments of the present invention, the precursor compounds, or oxides of the respective donor components, can be subject to processing conditions that promote or maintain chemical stability until reaction to a desired phase.

The lithium donor or source can comprise lithium hydroxide, lithium carbonate, or mixtures thereof. The oxidizing agent can comprise lithium nitrate or nickel nitrate or mixtures thereof. In some cases, the lithium source can comprise or consist of lithium nitrate as well as lithium hydroxide. The first metal donor can comprise magnesium hydroxide, magnesium carbonate, magnesium oxide, or mixtures thereof. The second metal donor can comprise nickel hydroxide, nickel sulfate, nickel nitrate, nickel oxide, or mixtures thereof.

The precursor compounds can have any form that facilitates mixing into the precursor mixture. For example, the precursor mixture can comprise a powder mixture of each of the precursor compounds or a slurry of each of the precursor compounds. Moreover, the precursor compound can be a masterbatch comprising hydroxides of lithium, the first metal donor, and/or the second metal donor. The oxidizing agent can be incorporated into the masterbatch as desired to facilitate processing and storage before utilization. In accordance with one or more embodiments, the precursor compounds can have any desired structure that, preferably, promotes efficient utilization of the lithium metal oxide materials of the present invention. Thus, the synthesis techniques of the invention can provide morphologically desirable lithium metal oxide materials.

The precursor compounds can have a variety of shapes that can be transformed to a material that can coat or be coated to form a component of an electrochemical device. For example, one or more of the precursor powder compounds can be spherically-shaped. Other shapes can be utilized as desired to accommodate or suit an end-user preference. Preferably, the synthesis process of the present invention can maintain, at least partially, the spherical shape throughout the processing or synthesis steps to provide, for example, a lithium magnesium nickel oxide material suitable as a cathode electrode in, for example, rechargeable electrochemical devices. Thus, in accordance with one or more preferred embodiments, the precursor mixture comprises a nickel donor, such as but not limited to nickel hydroxide, having a spherical shape. However, any shape and form of the starting materials of the composition of the present invention can be utilized.

In accordance with still further embodiments, the nickel donor can comprise a high density, e.g., high tap density, nickel hydroxide.

The $Li_xMg_yNiO_2$ compositions of the present invention can be prepared by utilizing precursor compounds with pre-defined or pre-selected particle sizes and morphologies. Any particle size can be utilized to create the composition of the present invention. For example, the particle size of a nickel donor precursor such as $Ni(OH)_2$ can be in the range of about 2 µm to about 20 µm.

In accordance with one or more embodiments, the material molar ratios of the precursor compounds can be selected to provide a composition having the general material formula $Li_xMg_yNiO_2$, where $0.1<x<1.3$, and $0.01<y<0.1$, $0.9<x+y<1.3$. In some cases, the ratios can be selected to so that $0.9<x<1.1$, and $0.02<y<0.05$. In still other cases, x can be about 1-y.

In yet other embodiments in accordance with the present invention, the $Li_xMg_yNiO_2$ or $Li_{1-y}Mg_yNiO_2$ materials can have any one of the following formula: $Li_{1.05}Mg_{0.005}NiO_2$, $Li_{1.05}Mg_{0.01}NiO_2$, $Li_{1.05}Mg_{0.02}NiO_2$, $Li_{1.05}Mg_{0.025}NiO_2$, $Li_{1.05}Mg_{0.030}NiO_2$, $Li1.05Mg_{0.04}NiO_2$, and $Li_{1.05}Mg_{0.05}NiO_2$. Thus, the precursor compounds can be selected in such ratios that provide such compositions.

The precursor compounds are typically pre-mixed to allow homogeneous mixing. In still further embodiments, the materials of the present invention can be crystallized by, for example, heating to sinter and facilitate crystallization into the compositions of the present invention.

The synthesis process can comprise mixing the precursor compounds into a substantially homogeneous mixture. The synthesis process can further comprise heating the precursor mixture in one or more heating stages or steps, e.g., two or more heat soaks, according to a predetermined heating profile. The synthesis process typically promotes oxidation, or oxyhydroxide formation, of the corresponding donor components; mixing, typically ionic mixing, of such components; and crystallization into a lithium metal oxide composition, wherein the first metal of the composition, e.g., magnesium, is associated with a 3a site and the second metal, e.g., nickel, is associated with the 3b site. For example, in a lithium-magnesium-nickel oxide composition, the mixture can be heated to a first heating temperature that promotes preferential formation of $Ni^{3+}$ over $Ni^{2+}$.

In accordance with one or more embodiments of the invention, the first heating step or stage can involve heating the green, precursor mixture to allow oxide formation and/or ion mixing without, or at least minimal, valence changes of the donor compounds. For example, the precursor mixture can be heated to a heat soak temperature of about 450° C. in a first heating step. This first heat soaking temperature can range from about 350° C. to about 700° C. The second heating step can comprise heating to promote crystallization of the transformed oxide mixture by, for example, heat soaking at a second heat soak temperature of about 700° C. The second heat soaking temperature can range from about 600° C. to about 800° C.

Preferably, the first soaking temperature is maintained until the precursor compounds have been substantially transformed into their oxide counterparts. For example, the first soaking temperature can be maintained for about one hour but can be maintained for as long as about six hours. In accordance with other embodiments, the first heat soak condition can be maintained for any duration such that the synthesis procedure can proceed to the next heating stage to commence or promote crystallization, i.e., without maintaining a first soaking temperature. The second soaking temperature can be maintained, for example, until the lithium metal oxide has crystallized to a desired extent. Thus, for example, the second heat soak can be maintained for about one hour but can be maintained for as long as about six hours.

Heating, as well heat soaking, can be performed with exposure to an oxidizing atmosphere such as air or pure oxygen.

The first heating step can comprise raising the temperature at a rate sufficient to promote oxide formation while reducing any tendency to destabilize the precursor morphology. For example, the precursor mixture can be heated at a rate of about 20° C. per minute, about 10° C. per minute, or even about 5° C. per minute. Control of the heating rate may depend on several factors including, but not limited to, the amount being processed, the desired relative composition, as well as the effective area exposed to the oxidizing atmosphere. The second heating stage can comprise raising the temperature to be sufficient to facilitate crystallization such that the first metal tends to be associated with the 3a site and the second metal tends to be associated with the 3b site. For example, the oxide mixture can be heated at a rate of about 10° C. per minute, about 5° C. per minute, or even about 2° C. per minute.

After heat treatment, the materials can be allowed to cool naturally to room temperature by, for example, natural convection. Heat soaking can be performed in any suitable equipment. For example, a furnace or oven accommodating the mixture can be utilized. The furnace can be supplied with air and/or oxygen.

The sintered, crystallized material can be ground in any suitable grinding apparatus. For example, a mortar grinder (e.g., Model RM100 grinder available from Retsch/Brinkmann or Brinkmann Instruments, Inc., Westbury, New York) fitted with an agate mortar and pestle, can be utilized to grind the crystallized composition to render it with a desired particle size. Other suitable grinding methods or systems can include, for example, ball milling, jet milling, attritor mill, hammer mill and pin mill devices. The desired particle size can vary and can depend on the specific application or use. Thus, in accordance with one or more embodiments of the invention, the $Li_xMg_yNiO_2$ composition can be formed as particles by grinding for about five minutes until a mean particle size of about 2 µm to about 20 µm, preferably about 5 µm to about 10 µm, is achieved.

In accordance with one or more preferred embodiments of the present invention, the $Li_xMg_yNiO_2$ composition, typically as particles, can further comprise a coating layer that further improves a first cycle efficiency, life, and/or safety or even reduces gassing when the composition is utilized as a cathodic material in electrochemical devices. In accordance with still further embodiments of the invention, the $Li_xMg_yNiO_2$ particles further comprise one or more coating layers that reduces any gelling tendencies when the particles are prepared as an electrode paste. For example, the particles can be coated to reduce the likelihood of gelling in a mixture comprising NMP, PVDF, $Li_xMg_yNiO_2$, and conductive carbon, which is yet another advantage over non-coated nickelates.

In accordance with one or more embodiments of the invention, the coating layer can comprise a composition having a formula $LiCoO_2$. The coated $Li_xMg_yNiO_2$ particles can be prepared by mixing therewith a lithium salt solution or mixture such as, but not limited to $LiNO_3$, LiOH, LiAc, $Li_2SO_4$, $Li_2CO_3$, with a cobalt containing salt solution. In accordance with one or more embodiments of the invention, the lithium salt can comprise $LiNO_3$ and the cobalt salt can comprise $Co(NO_3)_2 6H_2O$. The molar ratio of Li/Co can vary but typically ranges from about 0.6 to about 1.4. Preferably, the Li/Co molar ratio ranges from about 0.95 to about 1.05 so that the molar ratio of the Co content, in the coating layer, to the Ni content, in the core layer, ranges from about 0.01 to about 0.4, more preferably from about 0.05 to about 0.15.

If any water, which is typically carried with the salts, is present, it is preferably allowed to evaporate utilizing any suitable techniques. For example the mixture can be heated on a hot plate with stirring until dry, or in a rotating drying oven.

The precursor-coated material can then be heated or sintered in air using any suitable apparatus, such as a muffle furnace to facilitate oxidation and/or crystallization of the coating layer on the core. For example, the coating layer can be synthesized by raising the temperature of the precursor coated $Li_xMg_yNiO_2$ particles at any suitable rate, such as about 5° C. per minute, and maintained or soaked at a temperature of about 450° C. for about one hour. A second soaking temperature can be utilized by raising the temperature at a rate of about 2° C. per minute and maintained at a temperature of about 700° C. for about two hours to promote crystallization of the coating layer. Such an exemplary sintering treatment can provide a coated material having a concentration gradient structure wherein more cobalt can be present at or near the outer surface compared to the region at or near the core layer. Other techniques may be utilized that provides a coated core material having the composition of the present invention.

The drying stage can be performed until the mixture is sufficiently dry. For example, drying can be performed by heating at a rate of about 2° C. per minute to a temperature of about 110° C. The drying temperature can be maintained as long as necessary and may last from 0 minutes to one or more hours.

The first heating rate to produce the one or more coating layers can vary and may range from about 2° C. per minute to about 10° C. per minute. The first heat soaking temperature can range from about 300° C. to about 500° C. This first heat soaking temperature can be maintained until the sufficient or desired oxide conversion has been achieved. It can be maintained from 0 minutes to one or more hours. The second heating rate can vary from about 2° C. per minute to about 10° C. per minute. The second heat soaking temperature can range from about 650° C. to about 750° C. It is believed that higher soaking temperatures may promote degradation of the core layer to other than the preferred crystallographic arrangement. The coated particles can be allowed to cool to room temperature.

Any suitable equipment may be utilized in the drying/heating/soaking process including, for example, any oven or furnace that provides an appropriate oxidizing atmosphere.

The sintered, coated material can be further processed to obtain a particle sized between about 8 μm to about 12 μm. For example, the sintered, coated material can be ground for about five minutes in a mortar grinder fitted with an agate mortar and pestle.

EXAMPLES

The function and advantages of these and other embodiments of the present invention can be more fully understood from the examples below. The following examples illustrate the benefits and/or advantages of the compositions and techniques of the present invention but do not exemplify the full scope of the invention.

In the examples, the following test protocols were performed.

Protocol 1. Rate Capability Test and Formation—1st Cycle Efficiency

A coin cell was used for material life test utilizing lithium metal as the counter electrode. The positive electrode of the coin cell was made from a composite cathode prepared in accordance with Example 2. The electrolyte was EC/DEC (1:1)-$LiPF_6$, 1 M (available from EM Industries, Inc., Hawthorne, N.Y.) and the separator was a glass fiber material (available from Fisher Scientific).

The cell was fully charged and discharged at a rate of C/20 for first cycle efficiency measurements, which is the ratio of the discharge capacity vs. the charge capacity. Thereafter the cell was cycled at rates of about C/5, C/2, 1C, 2C, 3C, and 5C from about 2.7 volts to about 4.2 volts. 1C rate was defined as about 150 mAh/g discharge in 1 hour.

Protocol 2. Life Cycle Test.

A coin cell was used for material life test. The positive electrode of the coin cell was made from a composite cathode, and the negative electrode was made from a composite anode, consisting of graphite as mesophase carbon microbeads (MCMB 2528, 90 wt %), PVDF binder (7 wt %) and carbon black (3 wt %). The electrolyte was EC/DEC (1:1)-$LiPF_6$, 1 M (available from EM Industries, Inc., Hawthorne, New York) and the separator was a glass fiber material (available from Fisher Scientific).

The cell was initially fully charged and discharged for 3 cycles at about C/5 rate, deep cycle. The deep cycles consisted of charging to about 4.2 V (fully charged) and discharging to about 2.7 V (fully discharged). The cell was fully charged, to about 4.2 V (100% state-of-charge (SOC)): the cell was then discharged to about 20% of full capacity at about 1C rate current to reach about an 80% SOC. Then the cell was cycled: discharging about 10% (to about 70% SOC) and charged 10% (to about 80% SOC) at about 1C rate current, typically referred to as a shallow cycle.

A deep cycle was performed after every 200 shallow cycles. This test provided an indication of the effective life of the cell under evaluation.

Protocol 3. Area Specific Impedance (ASI) Measurement.

The ASI, in $\Omega cm^2$, at various starting SOC conditions was determined by pulse discharging a coin cell. ASI was calculated according to:

$$ASI = A \cdot (\Delta V/I),$$

where A is the electrode area in $cm^2$, where I is the discharge current pulse at a rate of about 6C. The voltage variation (ΔV) is the voltage change during the discharge pulse.

For example, at a SOC=90%, the initial voltage is measured. The cell is discharged at a rate of 6C and the final voltage is measured after 18 sec.

ASI can correlate to the potential available power and allows for a comparison of power capability between materials and formulations for Li-ion cells. This can be particularly important for high pulse power applications.

Example 1

Synthesis of $Li_{1.05}Mg_{0.025}NiO_2$ Composition

A $Li_{1.05}Mg_{0.025}NiO_2$ composition was prepared and evaluated. The composition was prepared by dry mixing:

about 242.91 g $Li(OH)_2$ (anhydrous fine powder available from Sigma-Aldrich, Inc., St. Louis, Mo.)

about 14.79 g $Mg(OH)_2$ (fine powder available from Alfa Aesar, Ward Hill, Mass.)

about 34.97 g $LiNO_3$ (crystals available from Alfa Aesar, Ward Hill, Mass.)

The mixed materials were added to about 940.31 g $Ni(OH)_2$ (#543 high density spherical powder available from OM Group, Inc., Cleveland, Ohio) in a 1 liter jar. The compounds were mixed by shaking in the jar.

The homogeneous precursor powders (precursor compounds) were placed in alumina crucibles and sintered.

Sintering was performed by heating at a rate of about 5° C./minute to about 450° C. and held at about 450° C. for about four hours. The temperature was then raised at about 2° C./minute to about 700° C. and held for about four hours.

The sample was then allowed to cool naturally to room temperature. The cooled sample was ground for about five minutes to break up any agglomerates. The powder material was sieved through a No. 270 mesh to remove larger particles and to ensure a desired 10 μm particle size.

Figure 2:
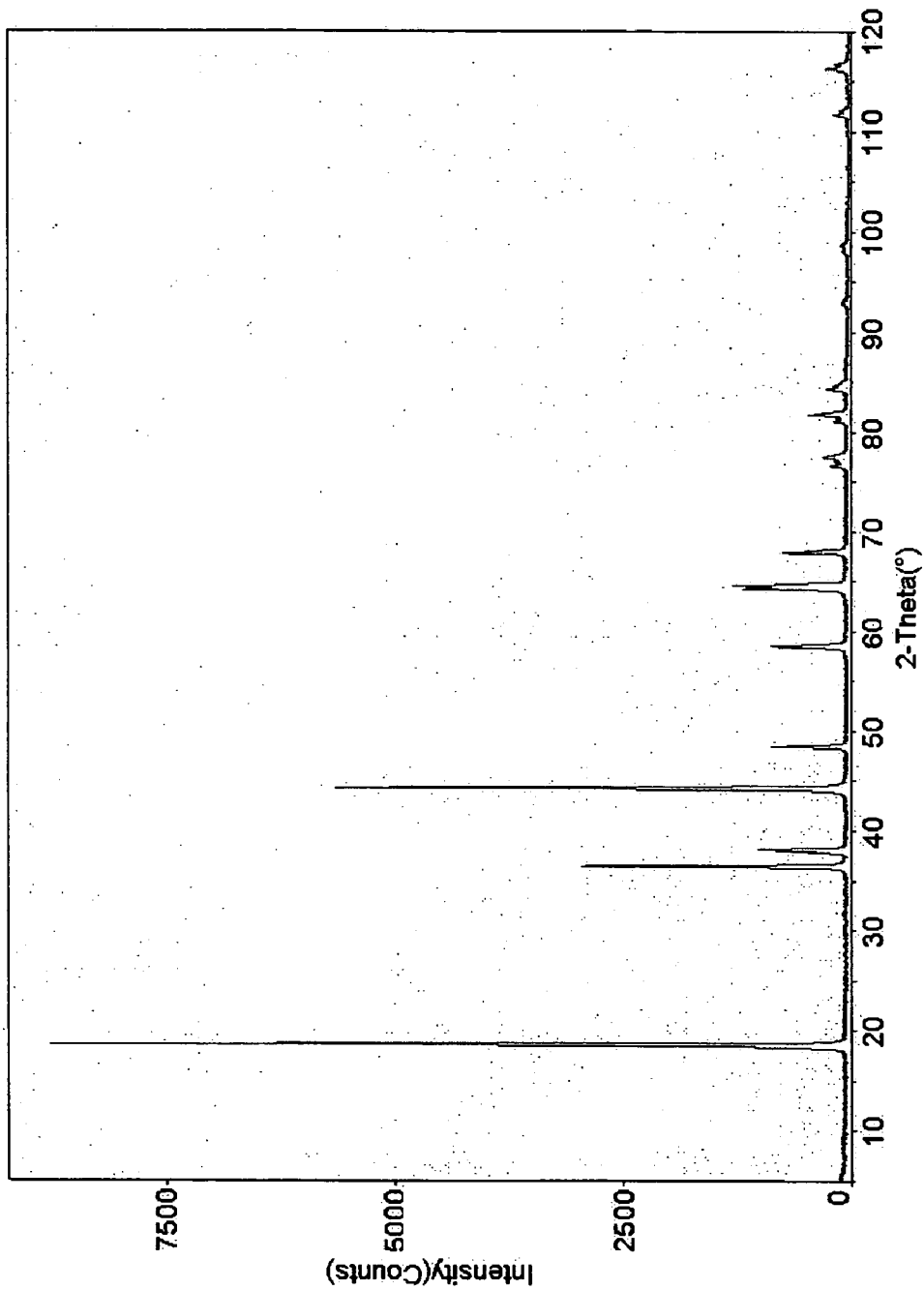
FIG. 2 is an X-ray diffraction pattern of the composition shown in FIG. 1.

FIG. 1 is a copy of scanning electron micrograph showing the morphology of the about 10 μm spherical core material. An X-ray diffraction pattern (XRD) analysis was performed and showed that the produced composition was phase-pure with no visible impurities. FIG. 2 is a copy of the XRD plot of the resultant composition. The XRD data shows that the resulting powder is essentially free of impurities.

Example 2

Fabrication and Electrochemical Performance Evaluation of $Li_{1.05}Mg_{0.025}NiO_2$-Based Electrochemical Cells A $Li_{1.05}Mg_{0.025}NiO_2$ cathode was fabricated by mixing about 90 wt % active cathode material powder produced as described in Example 1, about 6 wt % carbon black (AB 100% available from Chevron Phillips Chemical Company LP, The Woodlands, Tex.), and about 4 wt % K1120 binder containing 12% PVDF in NMP (available from Kureha Chemical of Japan). Additional NMP (n-methyl pyrrolidone) was added to produce a desired viscosity and promote mixing.

The solution was mixed in a 250 ml jar with about 50 steel balls on a paint shaker for about 30 minutes. The mixed slurry was coated onto an aluminum foil, about 20 μm thick, with a doctor blade having about a 100 μm micron coating gap.

The coated foil was dried at about 130° C. for about thirty minutes. The dried, coated foil was then densified by passing the dried, coated foil through pressurized calender rolls, about 3 inch diameter, set at about 100 psi. The densified, dried, coated foil was cut into about 2 $cm^2$ disks for use as electrodes. The active material weight on the disk electrodes was typically about 20 mg. The disk electrode was dried at about 80° C. under vacuum for about sixteen hours before cell assembly.

A coin cell (Hosen type #2025) was assembled by utilizing the disk electrode as the cathode. The coin cell was comprised of a glass fiber separator containing EC/DEC (1:1)-$LiPF_6$, 1 M electrolyte (available from EM Industries, Inc., Hawthorne, N.Y.) and a lithium metal anode. All assembly operations were performed in an argon-filled glove box wherein water and oxygen levels were less than about 2 ppm.

Figure 3:
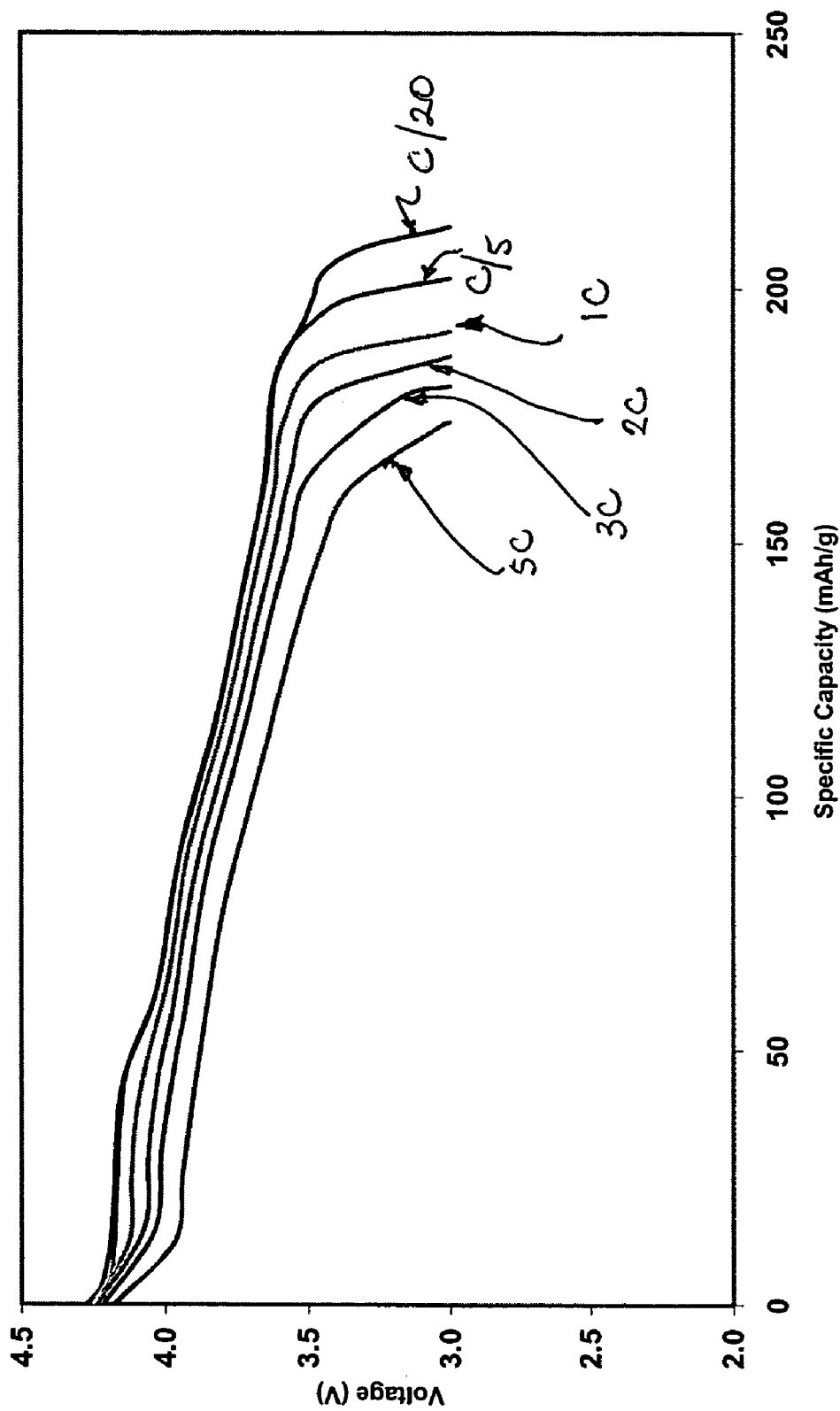
FIG. 3 is a graph showing the discharge profile, at different discharge rates, of the material shown in FIG. 1.

The assembled coin cell was evaluated using a cycler/tester (available from Maccor, Inc., Tulsa, Okla.) for capacity, efficiency, rate capability, power and cyclability, according to protocols 1, 2, and 3, described above. The electrochemical performance of the $Li_{1.05}Mg_{0.025}NiO_2$ composition (i.e., 0% coating) data are listed in Table 1 below. The discharge voltage profiles at different discharge rates are shown in FIG. 3, which shows that the capacity of the $Li_{1.05}Mg_{0.025}NiO_2$ composition was typically about 190 mAh/g.

TABLE 1

Electrochemical performance of $Li_{1.05}Mg_{0.025}NiO_2$-based cell.

| $LiMg_yNiO_2$ Core with $LiCoO_2$ | | Specific Capacity at Specified Rate | | | | |
|---|---|---|---|---|---|---|
| Coating Level mol % | 1st Cycle Efficiency % | C/5 mAh/g | 1C mAh/g | 2C mAh/g | 3C mAh/g | 5C mAh/g |
| 0% | 87 | 203 | 192 | 185 | 180 | 172 |
| 5% | 92 | 202 | 194 | 186 | 181 | 165 |
| 10% | 89 | 197 | 190 | 179 | 175 | 162 |
| 15% | 90 | 191 | 184 | 173 | 169 | 141 |

Example 3

Safety Testing of $Li_{1.05}Mg_{0.025}NiO_2$ Cathode

Coated cathodes were prepared and evaluated. The densified electrode prepared as described in Example 2 was cut into flag-shaped electrodes of about 60×50 $mm^2$. The active material weight on the electrode was typically about 300 mg. Similar to the cathode, an anode was prepared with formulation of MCMB:PVDF (93:7) was coated on a copper foil and cut to form 60×50 $mm^2$ flag electrodes. These were similarly densified by calendering at 175 psi. The flag electrodes were dried at about 80° C., under vacuum for about sixteen hours.

A two-electrode bag cell was assembled. The cell was comprised of the dried anode and cathodes, separated by a glass fiber separator with a rectangular size of about 65×55 $mm^2$. About 1.6 ml of EC/DEC (1:1)-$LiPF_6$, 1 M electrolyte was allowed to soak into the electrodes and separator and the assembly was compressed between two 70×60 $mm^2$ glass plates. The whole assembly was put into an aluminum-laminated bag, approximately 80×70 $mm^2$, and sealed under vacuum.

All assembly operations were performed in an argon-filled glove box wherein water and oxygen levels were less than about 2 ppm.

The bag cells were charged and discharged at about C/10 current rate, between about 4.1 V to about 2.7 V, then charged at about C/5 current rate to a capacity of about 180 mAh/g to about 200 mAh/g.

The cells with charged composite cathode were disassembled in an argon-filled glove box. The composite cathode powder was removed from the aluminum current collector. The composite electrode powder, with EC/DEC(1:1)-LiPF$_6$, 1 M electrolyte in a weight ratio of powder/electrolyte of 1:1, was loaded into a sealed pressure tight DSC pan. DSC measurements were performed with a continuous scan rate of about 5° C./minute up to about 450° C.

Figure 13:
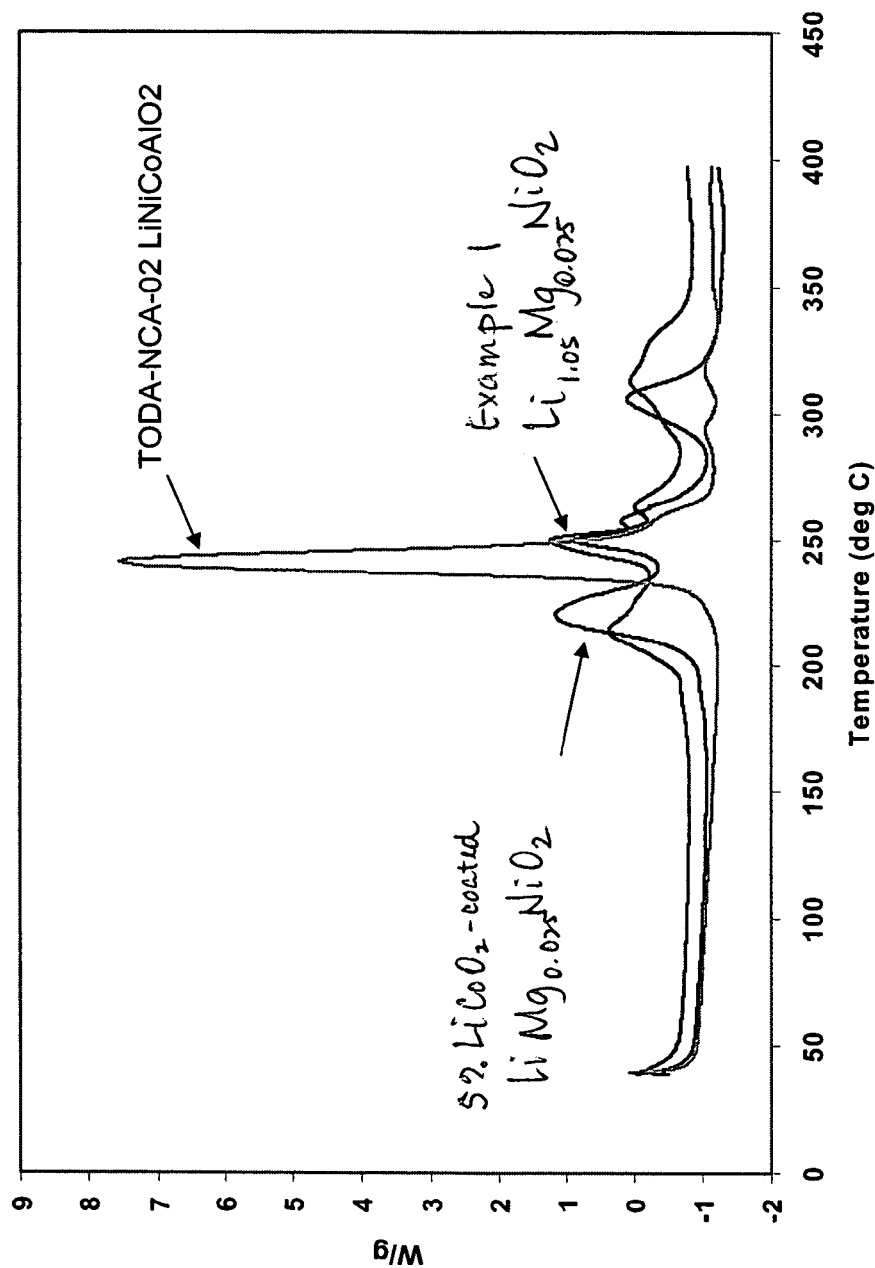
FIG. 13 is a graph showing the differential scanning calorimetry profile of a) $LiMg_{0.025}NiO_2$, b) about 5 mol % $LiCoO_2$ coated $LiMg_{0.025}NiO_2$, and c) TODA NCA-02 electrodes, which have been subjected to about 4.2V charging (100% state-of-charge) and immersed in electrolyte.

The safety data shown in FIG. 13 shows DSC curves of Li$_{1.05}$Mg$_{0.025}$NiO$_2$ and 5% LiCoO$_2$ coated material compared to LiNi$_{0.8}$Co$_{0.15}$Al$_{0.005}$O$_2$ (CA1505N cell available from TODA Co., Japan). The DSC curves provide a signature of chemical reactivity during exothermic reactions.

Example 4

Comparison to Li1.05NiO$_2$-Based Electrochemical Cells

A Li$_{1.05}$NiO$_2$ composition was prepared by dry mixing:
about 244.42 g Li(OH)$_2$ (anhydrous fine powder)
about 35.18 g LiNO$_3$ (crystals)

The mixed materials were added to about 946.15 g Ni(OH)$_2$ (OM Group, Inc. #543 High density spherical powder) in a 1 liter jar. The precursor powder mixture was mixed by shaking.

The precursor powders were placed in alumina crucibles and sintered. Sintering was performed by heating at a rate of about 5° C./minute to about 450° C. and held at about 450° C. for about four hours. The temperature was raised at about 2° C./minute to about 700° C. and held for about four hours.

The sample was then allowed to cool naturally to room temperature.

The cooled sample was ground for about five minutes to break up any agglomerates. The powder material was sieved through a No. 270 mesh to remove large particles and to ensure the desired 10 μm particle size. When subjected to XRD analysis, this material was shown to be phase-pure with no visible impurities. Electrochemical measurements of this powder were performed in accordance with the procedure described in Example 2. The performance results are listed in Table 2 (i.e., 0% coating).

TABLE 2

Electrochemical performance of LiNiO$_2$-based cell.

| LiNiO$_2$ Core with LiCoO$_2$ Coating Level atom % | 1$^{st}$ Cycle Efficiency % | Specific Capacity at Specified Rate | | | |
|---|---|---|---|---|---|
| | | C/5 mAh/g | 1C mAh/g | 2C mAh/g | 3C mAh/g | 5C mAh/g |
| 0% | 89 | 211 | 192 | 184 | 178 | 154 |
| 5% | 88 | 214 | 203 | 197 | 190 | 166 |
| 10% | 90 | 209 | 196 | 192 | 184 | 168 |
| 15% | 89 | 197 | 185 | 179 | 172 | 151 |

The data show that the performance, as quantified by specific capacity, of the LiMg$_y$NiO$_2$-based electrochemical cells of the present invention (see Table 1) are amongst the highest when comparing to the performance of typical lithium-nickel oxide materials.

Example 5

Comparison to LiCoO$_2$-Based Electrochemical Cells

A comparable composite cathode in an electrochemical cell was prepared using LiCoO$_2$ (C-5 grade available from Nippon Chemical Industrial Co., LTD., Tokyo, Japan) as the active material. Similar coin cells were prepared as in the previous example for evaluation.

The electrochemical data of this material are listed in Table 3.

TABLE 3

Electrochemical performance of LiCoO$_2$-based cell.

| Sample | 1$^{st}$ Cycle Efficiency % | Specific Capacity at Specified Rate | | | | |
|---|---|---|---|---|---|---|
| | | C/5 mAh/g | 1C mAh/g | 2C mAh/g | 3C mAh/g | 5C mAh/g |
| LiCoO$_2$ | 97 | 157 | 143 | 127 | 108 | 71 |

The data show that the electrochemical performance of the Li$_{1.05}$Mg$_{0.025}$NiO$_2$-based electrochemical cell of the present invention (see Table 1) exceeds the performance of typical lithium-cobalt oxide-based cells, which is the dominating material in the market presently.

Example 6

Performance of Varying Dopant Levels in Li$_{1.05}$Mg$_y$NiO$_2$ Material (y=0.005, 0.01, 0.02, 0.025, 0.03, 0.04, and 0.05)

Seven Li$_{1.05}$Mg$_y$NiO$_2$ compositions were prepared and evaluated where y varied from 0.005, 0.01, 0.02, 0.03, 0.04 and to 0.05. The synthesis procedure for these compositions were substantially similar to the procedure described in Example 1 except that the levels of Mg(OH)$_2$ were varied accordingly to obtain the various dopant levels.

When subjected to XRD analyses, all samples except for the sample having y=5% were shown to be phase-pure with no visible impurities. For this latter composition, Li$_{1.05}$Mg$_{0.05}$NiO$_2$, impurities were detected that indicated the presence of mixed magnesium oxides.

All samples were then tested electrochemically in coin cells prepared similar to the procedure described in Example 2. The results are listed in Table 4.

TABLE 4

Electrochemical Properties of LiMg$_y$NiO$_2$ at varying Mg doping levels.

| Mg Doping Level in LiMg$_y$NiO$_2$ | 1$^{st}$ Cycle Efficiency % | Specific Capacity at Specified Rate | | | | | |
|---|---|---|---|---|---|---|---|
| | | C/20 mAh/g | C/5 mAh/g | 1C mAh/g | 2C mAh/g | 3C mAh/g | 5C mAh/g |
| 0 | 89 | 227 | 211 | 192 | 184 | 178 | 154 |
| 0.005 | 90 | 226 | 210 | 191 | 183 | 176 | 166 |
| 0.01 | 90 | 223 | 207 | 191 | 184 | 178 | 169 |
| 0.02 | 89 | 218 | 204 | 189 | 183 | 178 | 169 |
| 0.025 | 87 | 214 | 203 | 192 | 185 | 180 | 172 |
| 0.03 | 87 | 210 | 199 | 187 | 181 | 176 | 167 |

The data in Table 4 show that the electrochemical performance, e.g., at specific capacity at 1C rate, of the LiMg$_y$NiO$_2$-based cells of the present invention was better when compared to the performance of LiNiO$_2$-based cells, and superior to the performance of LiCoO$_2$-based cells.

Example 7

Synthesis of Li$_{1.05}$Mg$_{0.025}$NiO$_2$ Core Particles Coated with a LiCoO$_2$ Layer In this example, a lithium-magnesium-nickel oxide composition, substantially prepared as described in Example 1, was coated with a lithium-cobalt oxide layer.

To synthesize the coating layer, about 105.55 g LiNO$_3$ (crystalline powder, available from Alfa Aesar, Ward Hill, Mass.) and about 445.50 g Co(NO$_3$)$_2$.6H$_2$O (crystalline aggregates, also available from Alfa Aesar) were dissolved in about 200-300 ml distilled water. To which, about 1000 g of the Li$_{1.05}$Mg$_{0.025}$NiO$_2$ powder substantially prepared as described in Example 1 was added.

The excess water was removed by evaporation on a hot plate with stirring until the mixture became a thick slurry. The slurry was poured into an alumina crucible and sintered under the following heating profile: heat at a rate of about 2° C./min to about 110° C., hold for about one hour at about 110° C., heat at a rate of 5° C./min to about 450° C., heat soak for about one hour at about 450° C., heat at a rate of about 2° C./min to about 700° C., and heat soak for about two hours at about 700° C.

The prepared sample was allowed to cool naturally to room temperature. Once cooled, it was ground for about five minutes to break up any agglomerates and sieved through a No. 270 mesh screen.

Figure 4:
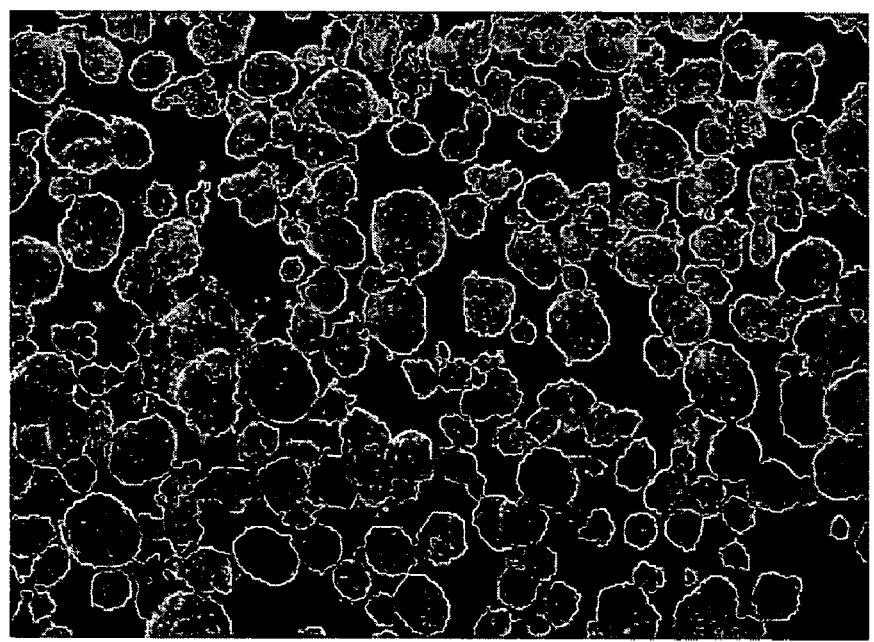
FIG. 4 is a copy of photomicrograph of a typical lithium-cobalt oxide-gradient coated lithium-magnesium-nickel oxide: composition in accordance with one or more embodiments of the present invention; here represented by an about 5 mol % $LiCoO_2:LiMg_{0.025}NiO_2$.
Figure 5:
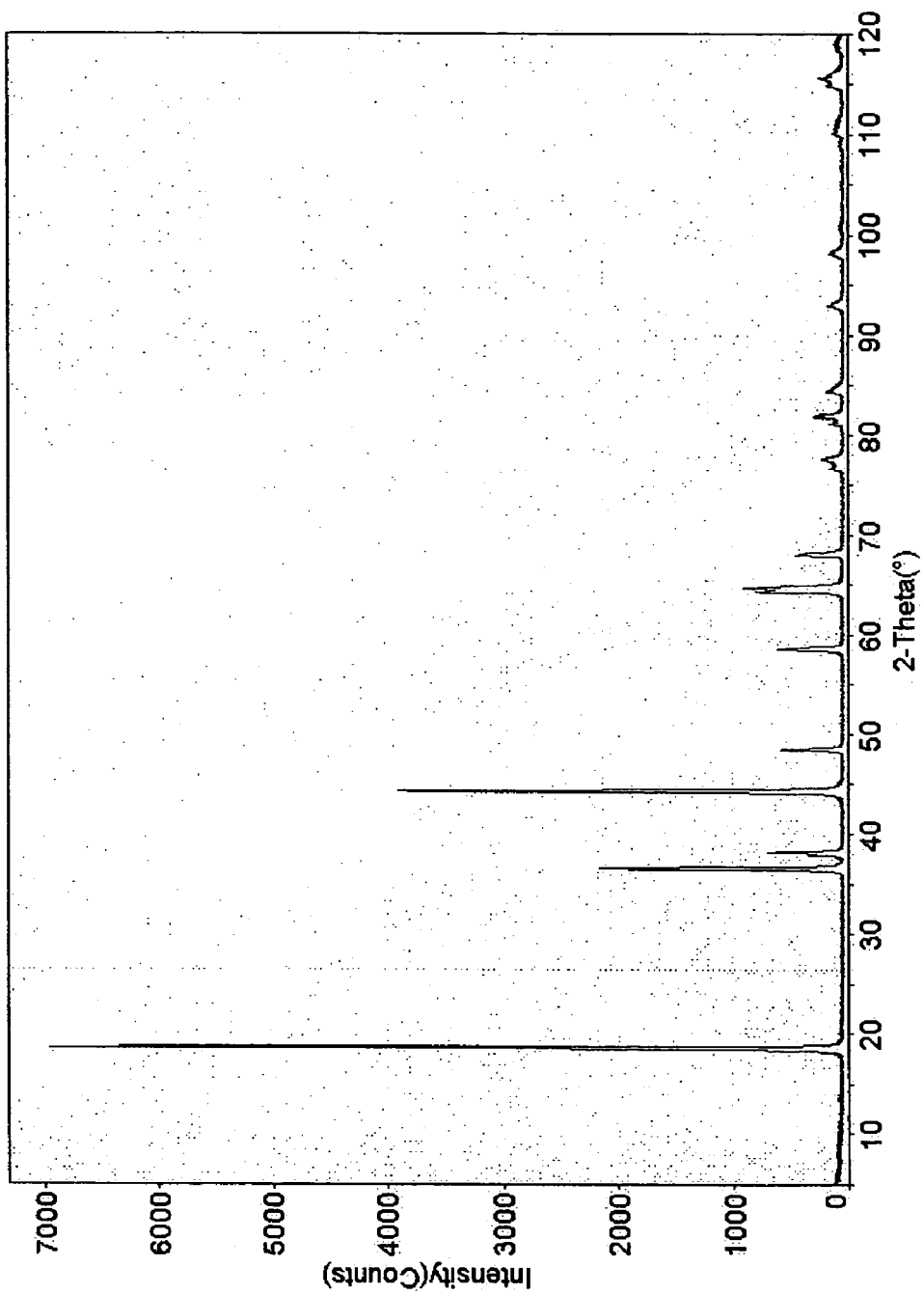
FIG. 5 is an XRD graph of the coated composition shown in FIG. 4.

XRD analysis shows that the prepared coated composition had a gradient profile, with no visible impurities, as can be seen in the copy of the XRD plot presented in FIG. 5 represented here by 5 mol % LiCoO$_2$ coated LiMg$_{0.025}$NiO$_2$. A copy of an SEM photomicrograph for the same sample, FIG. 4, shows that the coated powder composition maintained its spherical, about 10 μm, morphology.

Figure 6:
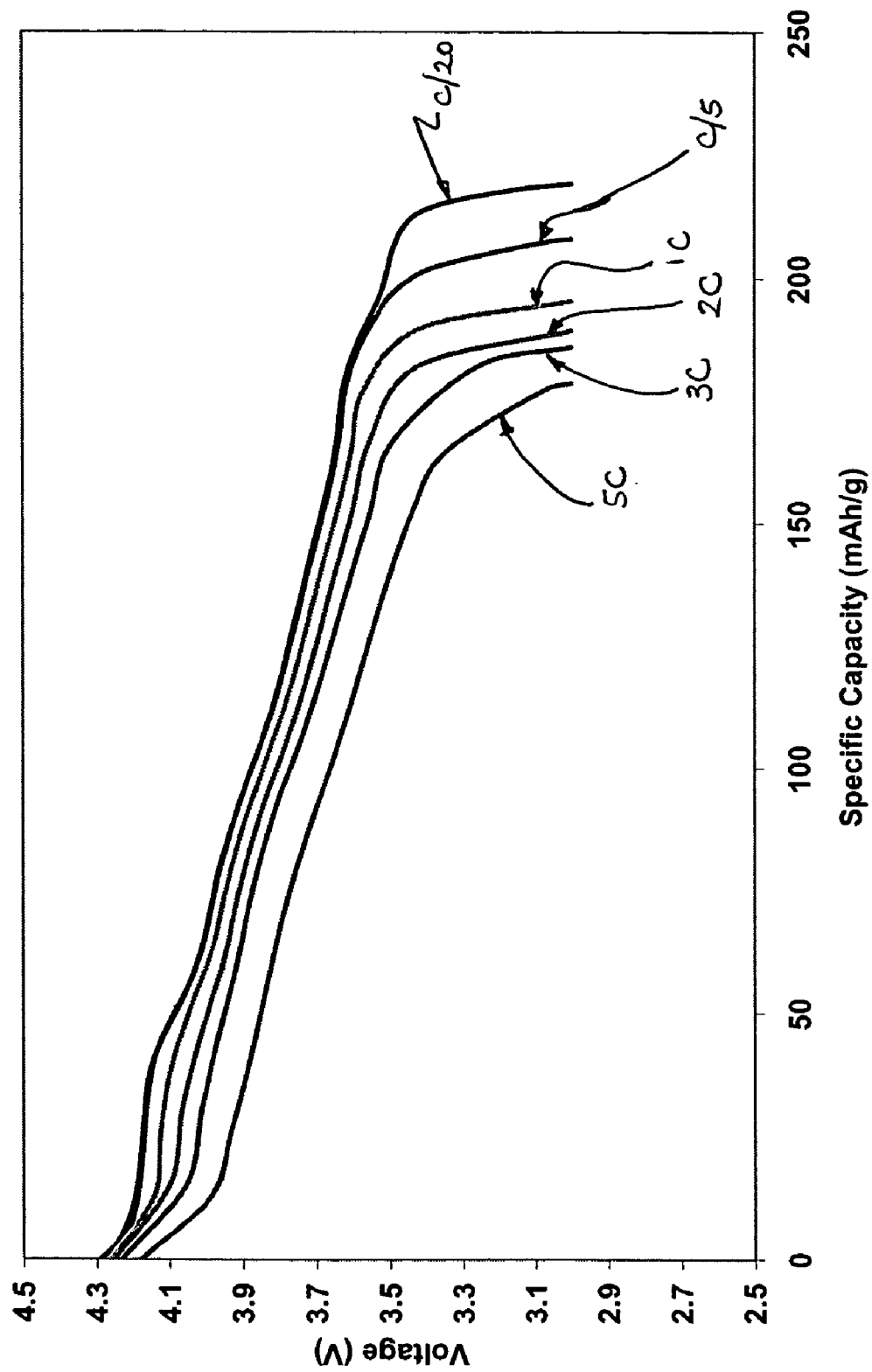
FIG. 6 is a graph showing the discharge profile of the composition shown in FIG. 4 having about a 5 mol % coating level at various rates.
Figure 7:
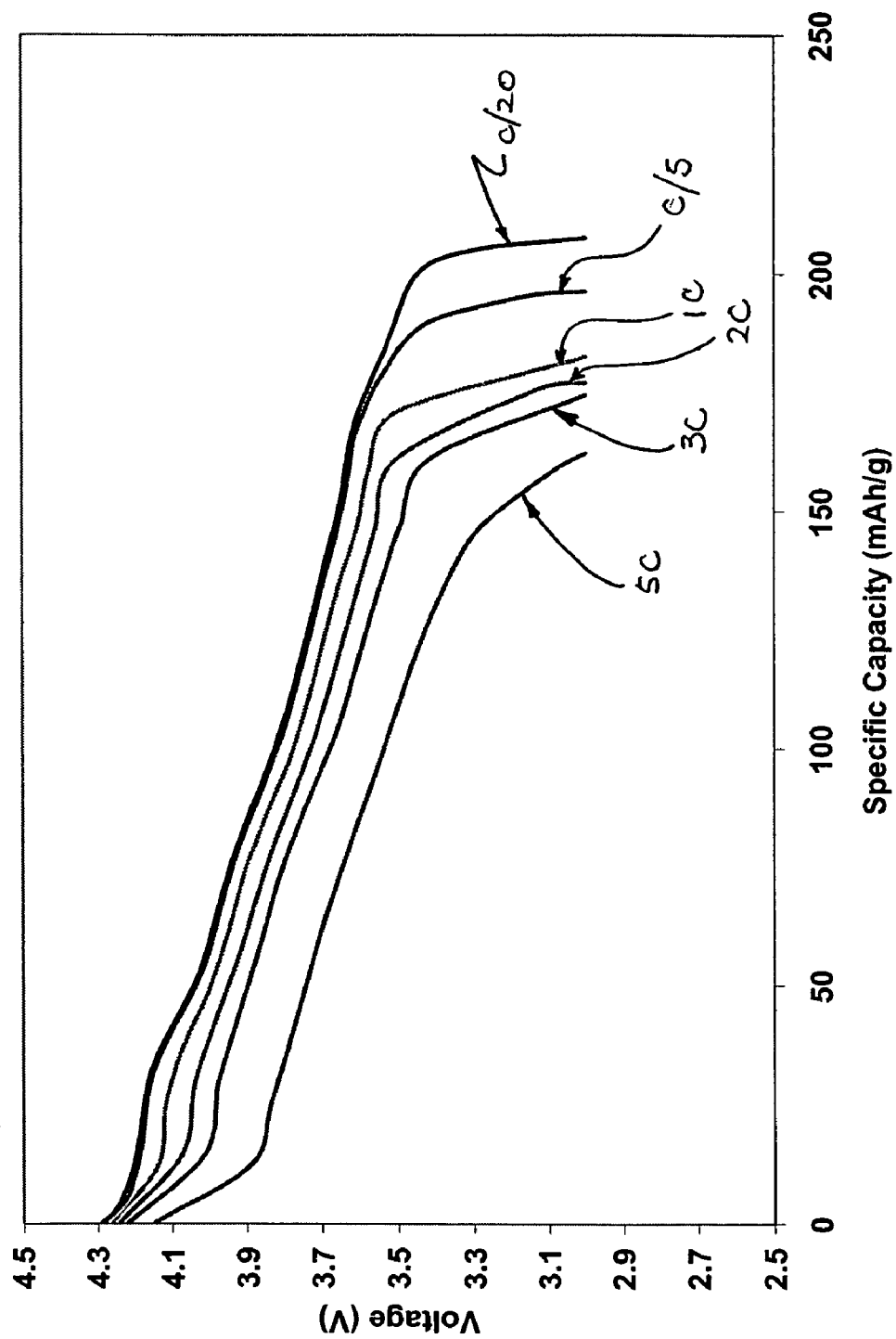
FIG. 7 is a graph showing the discharge profile of the composition shown in FIG. 4 having about a 10 mol % coating level at various rates.
Figure 8:
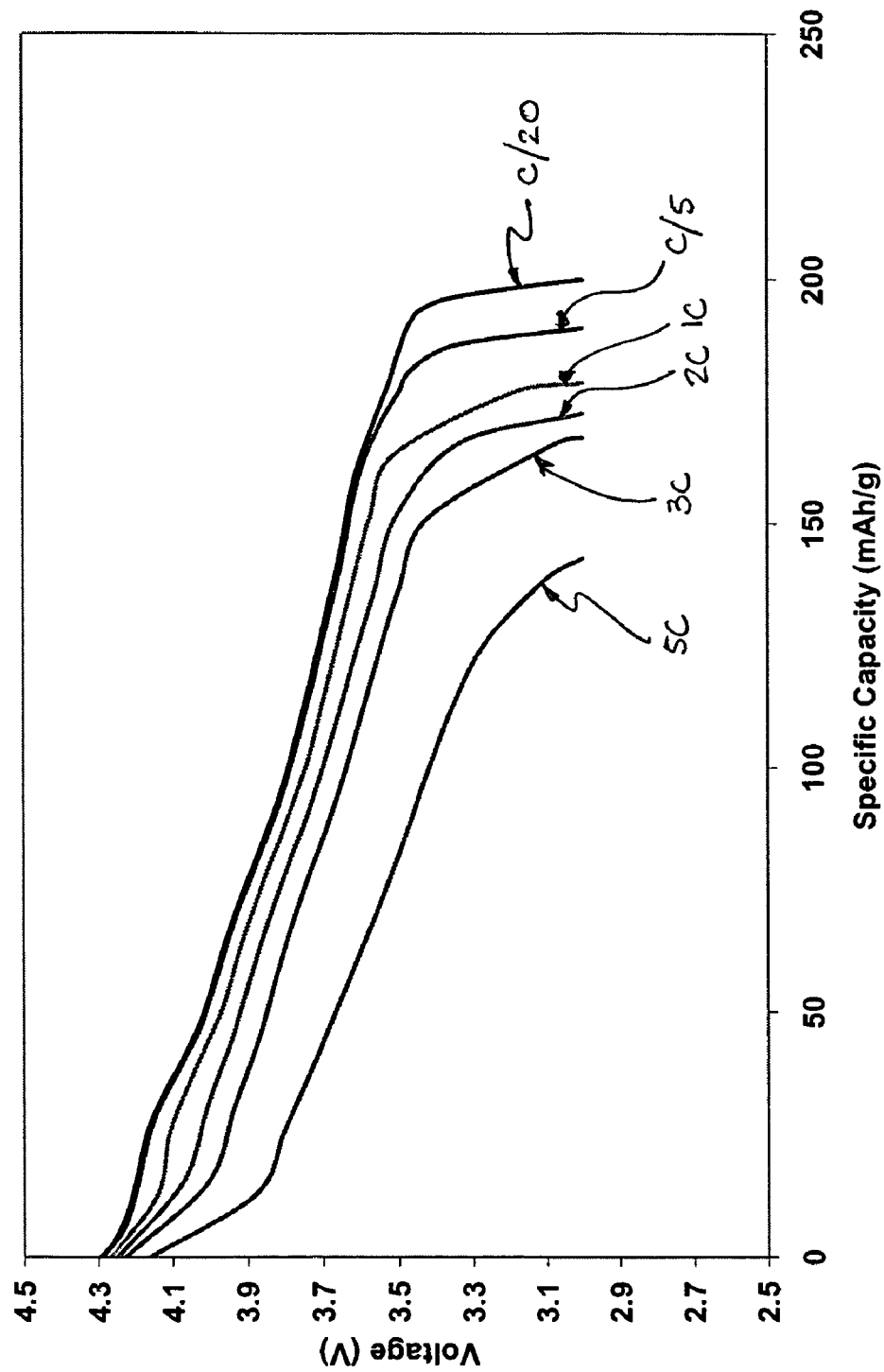
FIG. 8 is a graph showing the discharge profile of the composition shown in FIG. 4 having about a 15 mol % coating level at various rates.
Figure 11:
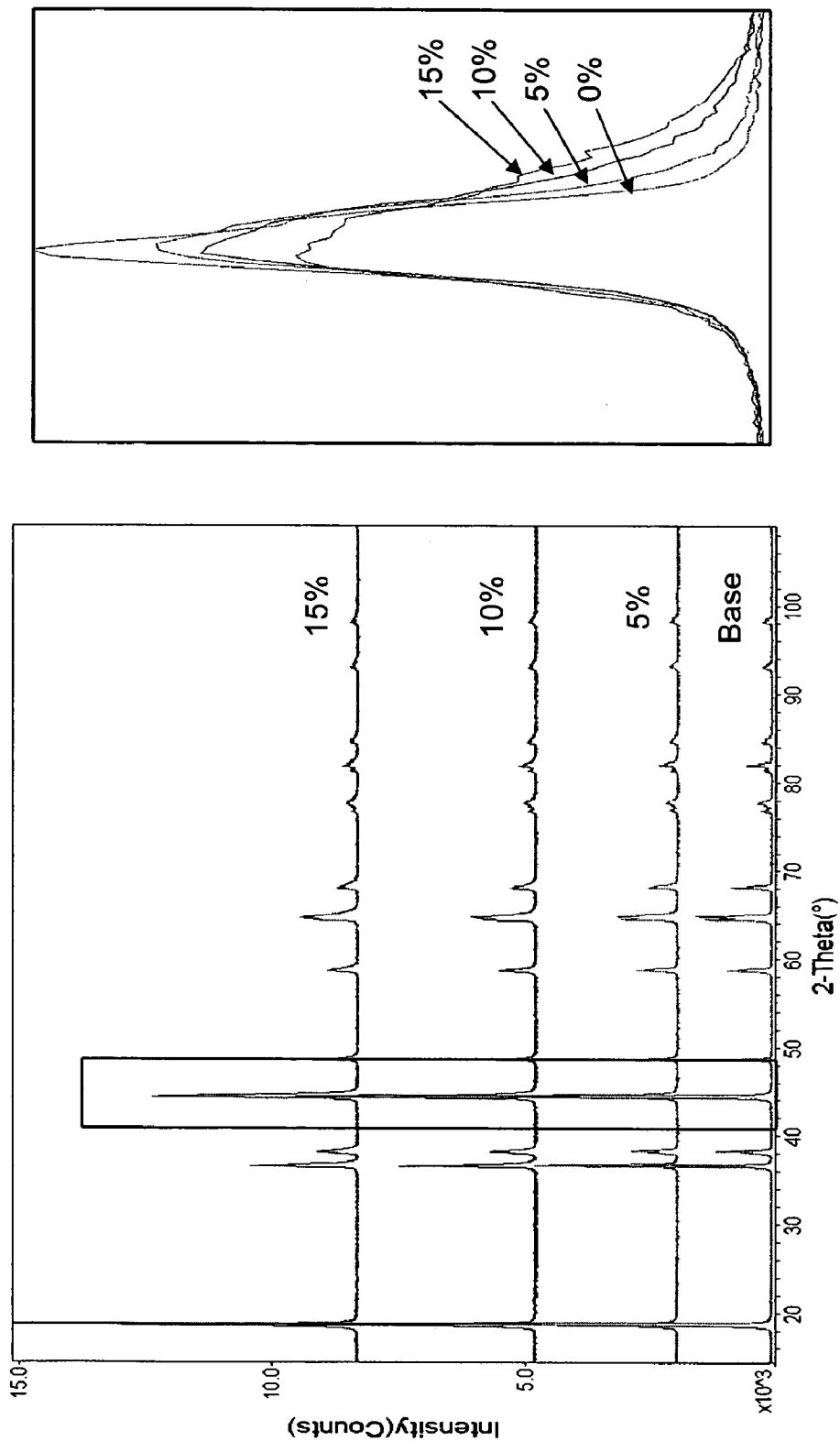
FIG. 11 is a graph showing the X-ray diffraction patterns showing peak profiles at about 5 mol %, 10 mol %, and 15 mol % gradient coating levels of a $LiCoO_2$ composition (with an enlarged portion shown in the right side), in accordance with one or more embodiments of the invention.

Table 1 lists rate capability and first cycle efficiency of Li$_{1.05}$Mg$_{0.025}$NiO$_2$ core materials coated with various levels of LiCoO$_2$ coating. FIGS. 6-8 are graphs showing the discharge profile of the LiCoO$_2$-coated Li$_{1.05}$Mg$_{0.025}$NiO$_2$-based core composition having, respectively, about 5 mol % coating, about 10 mol % coating, and about 15 mol % coating. The profiles show that the lithium-magnesium-nickel composition can be coated with up to about 15 mol% lithium-cobalt oxide layer and retain about the same electrochemical performance. FIG. 11 is an XRD comparison of these samples showing increasing gradients with amount of LiCoO$_2$ coating.

Example 8

Evaluation of LiCoO$_2$-Coated Li$_{1.05}$Mg$_{0.025}$NiO$_2$ Core Material

Two gradient coated Li$_{1.05}$Mg$_{0.025}$NiO$_2$ materials were synthesized and coated with about 10% and about 15% LiCoO$_2$ using the method in Examples 1 and 7. The gradient coating was detected by studying the increasing degree of asymmetry in the Bragg reflections. In particular, the peak 104 at about 44.4 degrees in 2-theta was used (FIG. 11) to show how the asymmetry of peak 104 continuously increased with the amount of LiCoO$_2$. The respective XRD patterns in FIG. 11 have been adjusted for 2-theta zero point position and normalized in intensity for comparison (shown in the insert in the right side of FIG. 11). The gradient coated samples were also evaluated electrochemically for rate capability and first cycle efficiency as listed in Table 1, according to protocol 1.

Example 9

Comparison of LiCoO$_2$-coated Li$_{1.05}$NiO$_2$ Core Material

Three gradient coated Li$_{1.05}$NiO$_2$ materials were synthesized and coated with 5%, 10% and 15% LiCoO$_2$ using the methods as substantially described in Examples 4 and 7. The coated samples were tested electrochemically for rate capability and first cycle efficiency as described above and protocol 1. The specific capacity results, listed in Table 2, show that lithium cobalt oxide coated lithium nickel oxide compounds of the present invention can provide better or at least equal performance capacity compared to non-coated compounds.

Figure 9:
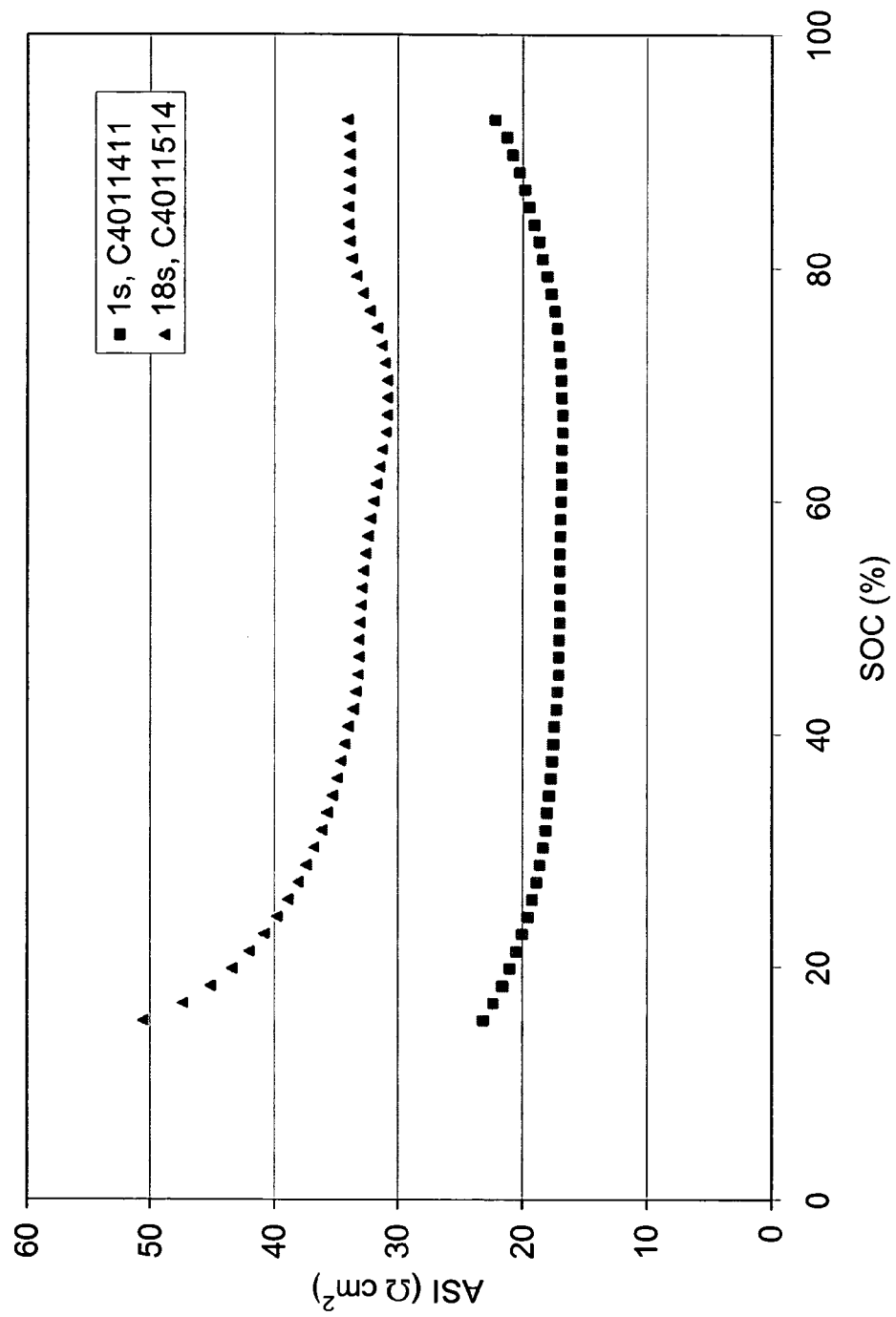
FIG. 9 is a graph showing the area specific impedance for a $LiMg_{0.025}NiO_2$ composition with about a 5 mol % $LiCoO_2$ gradient coating, using about a 1 s and an 18 s pulse according to protocol 3, in accordance with one or more embodiments of the invention.
Figure 10:
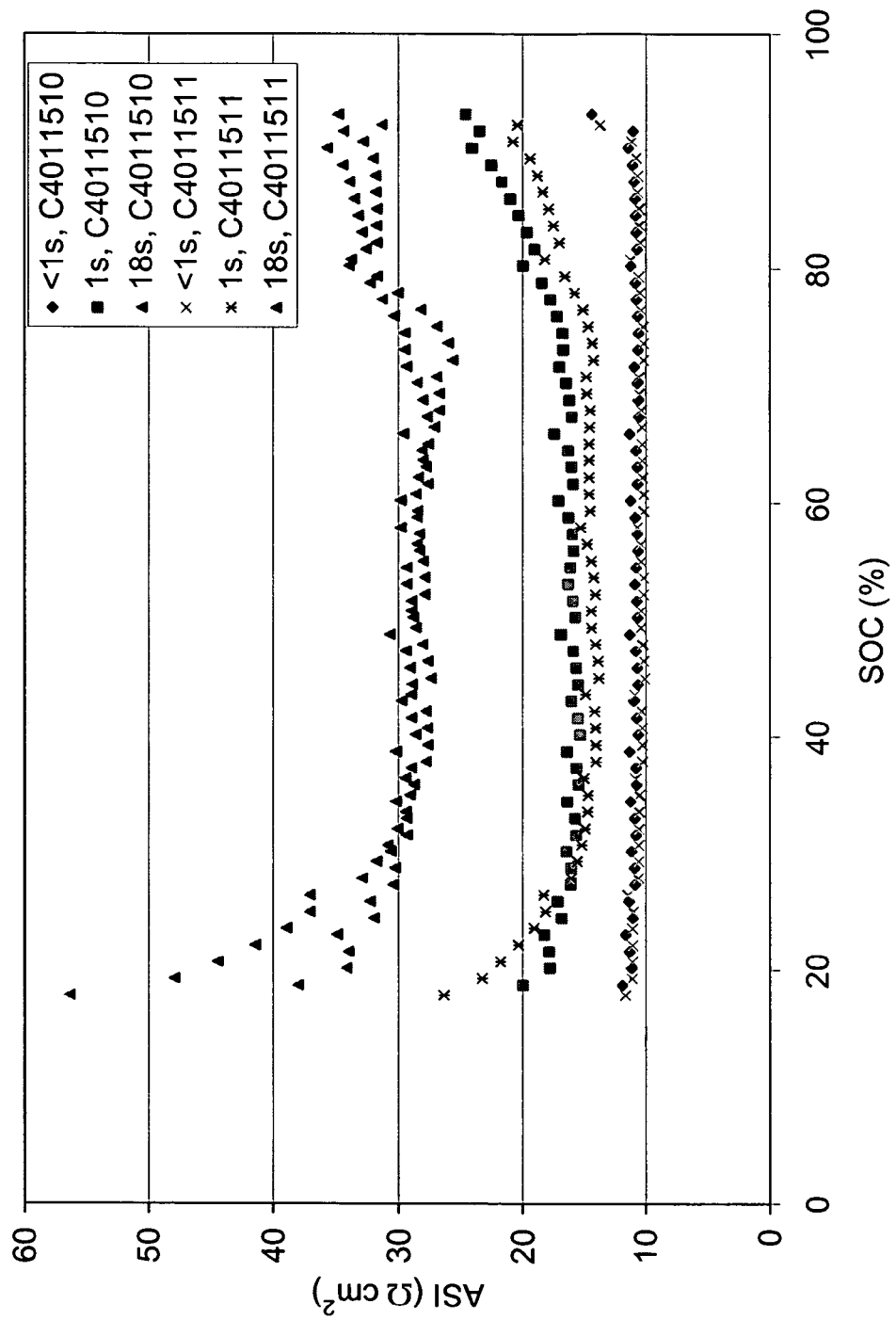
FIG. 10 is a graph showing the area specific impedance for various $LiMg_{0.025}NiO_2$ compositions, using 1 s and 18 s pulses according to protocol 3, in accordance with one or more embodiments of the invention.
Figure 12:
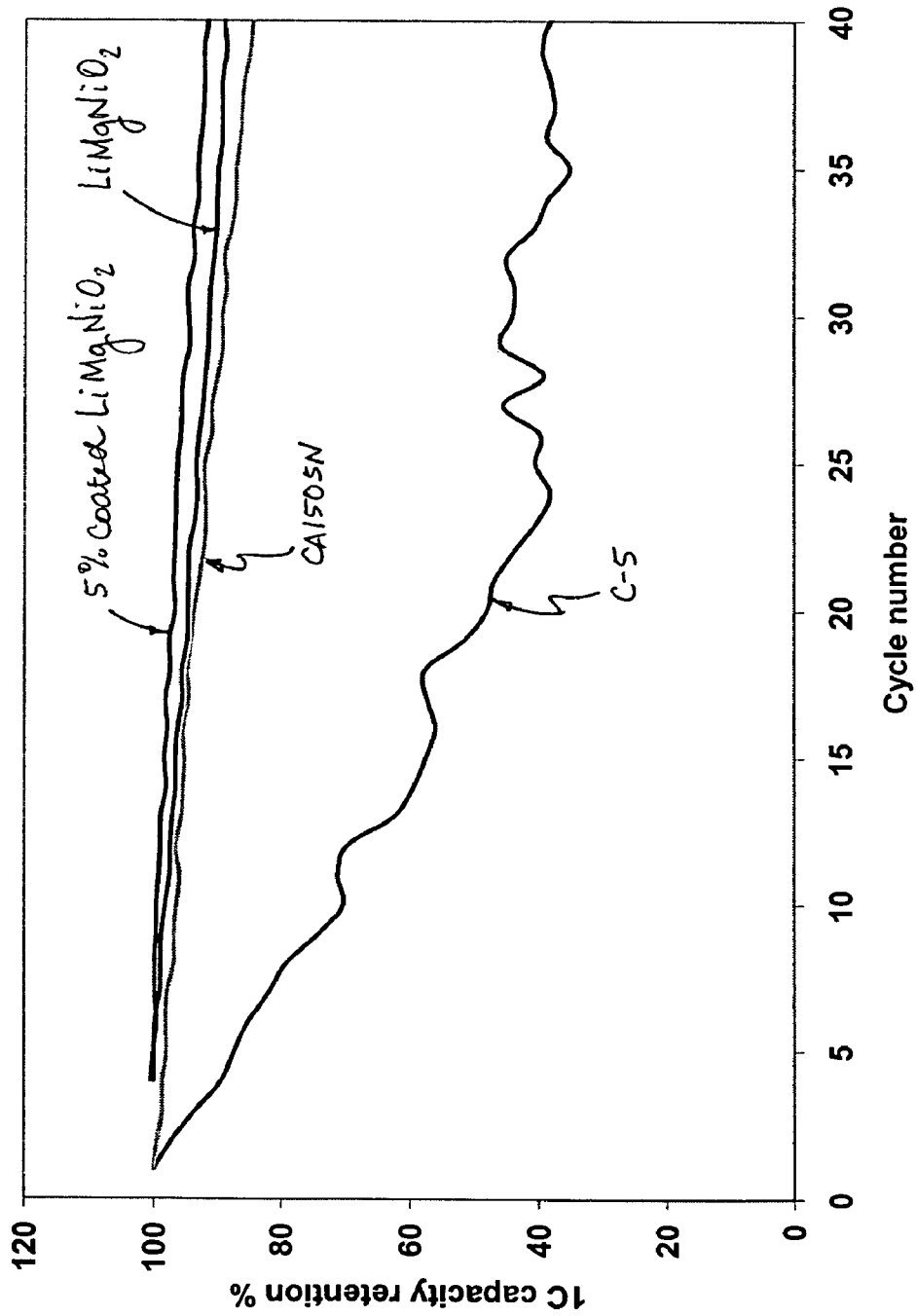
FIG. 12 is a graph showing the capacity retention of cells during about a 1 C discharge cycling utilizing a) $LiNiO_2$, b) $LiMgNiO_2$, c) about 5 mol % $LiCoO_2$ coated $LiMg_{0.025}NiO_2$, and d) CA1505N(TODA Co., Japan)

FIG. 9 shows the ASI of a cell utilizing the LiCoO$_2$-coated Li$_{1.05}$NiO$_2$ material, measured according to protocol 3 above and FIG. 10 shows several ASI measurements of a cell utilizing uncoated LiMgNiO$_2$ material. As shown in FIGS. 9 and 10, the performance, in terms of potential available power, of the lithium-cobalt-oxide coated lithium-nickel-oxide cells is comparable, if not better than cells utilizing the uncoated lithium-nickel-oxide materials. FIG. 12 shows the capacity retention at a discharge rate of about 1C of cells utilizing various active materials including lithium-nickel oxide, lithium magnesium nickel oxide, lithium-cobalt-oxide coated lithium magnesium nickel oxide, $LiN_{1.08}Co_{0.15}Al_{0.05}O_2$ (CA1505 cell available from TODA Co., Japan), and $LiCoO_2$ (C-5 grade available from Nippon Chemical Industrial Co., LTD., Tokyo, Japan). The results presented in FIG. 12 indicate that the cells utilizing the coated and uncoated lithium-magnesium-nickel oxides of the invention can have better performance compared to cells utilizing lithium cobalt oxide. FIG. 13 is a graph showing the differential scanning calorimetry of the uncoated and lithium-cobalt oxide-coated lithium-magnesium-nickel oxide material of the present invention compared to a commercially available lithium-nickel-cobalt oxide material at about a 100% state of charge and shows that the coated and uncoated materials are more thermally stable.

Those skilled in the art should appreciate that the parameters and configurations described herein are exemplary and that actual parameters and/or configurations will depend upon the specific application in which the systems and methods of the present invention are use. Those skilled in the art should recognize or be able to ascertain, using no more than routine experimentation, equivalents to the specific embodiments of the invention. For example, the shape of the particles of the present invention, in either the coated or uncoated embodiments, can include particles shaped to facilitate packing and/or increase packing and/or tap density such as, but not limited to, plates or having one dimension substantially greater than a second and/or third dimension. Further, a range or combination of particle sizes can also be utilized. For example, a mixture of lithium cobalt oxide coated lithium magnesium nickel oxide particles with uncoated lithium magnesium nickel oxide particles can be utilized in the systems, device, and techniques of the present invention wherein the mixture can have a first type or kind of particle, e.g. uncoated, having a first particle size and a second type or kind of particle, e.g. coated and/or a different Mg loading, having a second particle size. It is therefore to be understood that the foregoing embodiments are presented by way of example only and that, within the scope of the appended claims and equivalents thereto, the invention may be practiced otherwise than as specifically described. Further, it is to be appreciated various alterations, modifications, and improvements will readily occur to those skilled in the art. Such alterations, modifications, and improvements are intended to be part of this disclosure, and are intended to be within the spirit and scope of the invention. Moreover, the present invention is directed to each feature, system, or method described herein and any combination of two or more features, systems, and/or methods, if such features, systems, or methods are not mutually inconsistent, is considered to be within the scope of the present invention as embodied in the claims. The use of the clarifiers such as "first" and "second" or even "third" and "fourth" is intended to modify an element and does not create an implication of priority, precedent, sequence, or temporal order, over another but is intended as labels.

What is claimed is:

1. An electrode composition comprising:
   a first material having a formula consisting of $Li_xMg_yNiO_2$ wherein $0.9<x<1.3$, $0.01<y<0.1$, and $0.91<x+y<1.3$; and
   a second material applied upon the first material, the second material having a formula $Li_aCo_bO_2$ wherein $0.7<a<1.3$, and $0.9<b<1.2$.

2. The composition of claim 1 wherein $0.9<a<1.3$ and $0.9<b<1.2$.

3. The composition of claim 1 wherein the molar ratio of Co:Ni ranges between about 0.01 to about 0.8.

4. The composition of claim 1 wherein $0.9<x<1.1$ and $0.02<y<0.05$.

5. The composition of claim 4 wherein $x=1.05$ and $y=0.025$.

6. The composition of claim 1, wherein Li and Mg are predominantly associated with a crystallographic 3a site and Ni is predominantly associated with a crystallographic 3b site.

7. The composition of claim 1, wherein the second material has a concentration gradient with respect to the amount of cobalt therein.

8. An electrochemical cell comprising an electrode comprising particles comprising a first material having a formula consisting of $Li_xMg_yNiO_2$, wherein $0.9<x<1.3$, $0.01<y<0.1$, and $0.91<x+y<1.3$, and a second material having a formula $Li_aCo_bO_2$, wherein $0.7<a<1.3$, and $0.9<b<1.2$.

9. The electrochemical cell of claim 8 wherein $0.9<x<1.1$, $0.02<y<0.05$, $0.9<a<1.3$, and $0.9<b<1.2$.

10. The electrochemical cell of claim 9 wherein $x=1.05$ and $y=0.025$, and $a=1$.

11. The electrochemical cell of claim 8, wherein Li and Mg are predominantly associated with a crystallographic 3a site and Ni is predominantly associated with a crystallographic 3b site.

12. The electrochemical cell of claim 8, wherein the second material has a concentration gradient with respect to the amount of cobalt therein.

13. The electrochemical cell of claim 8, wherein the first material is formed by heating a first mixture comprising sources of lithium, magnesium, and nickel in an oxidizing atmosphere at a temperature of about 350°-800° C.

14. The electrochemical cell of claim 13, wherein the first material is formed by heating the first mixture for a period sufficient to crystallize the first mixture such that lithium and magnesium are predominantly associated with a crystallographic 3a site and nickel is predominantly associated with a crystallographic 3b site.

15. The electrochemical cell of claim 13, wherein the second material is formed by heating the first mixture and a second mixture comprising sources of lithium and cobalt at a temperature of about 300°-900° C.

* * * * *